UNITED STATES PATENT OFFICE.

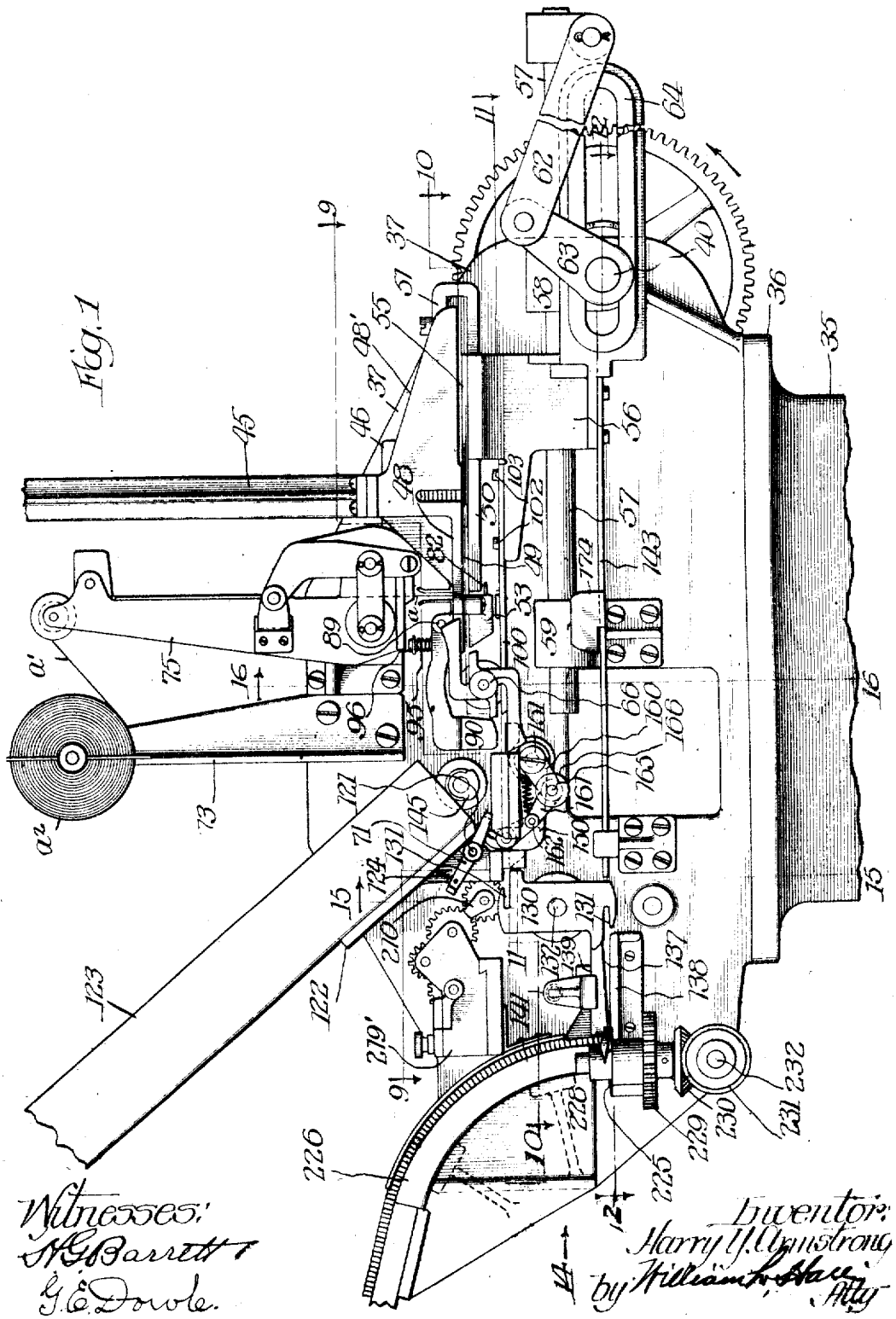

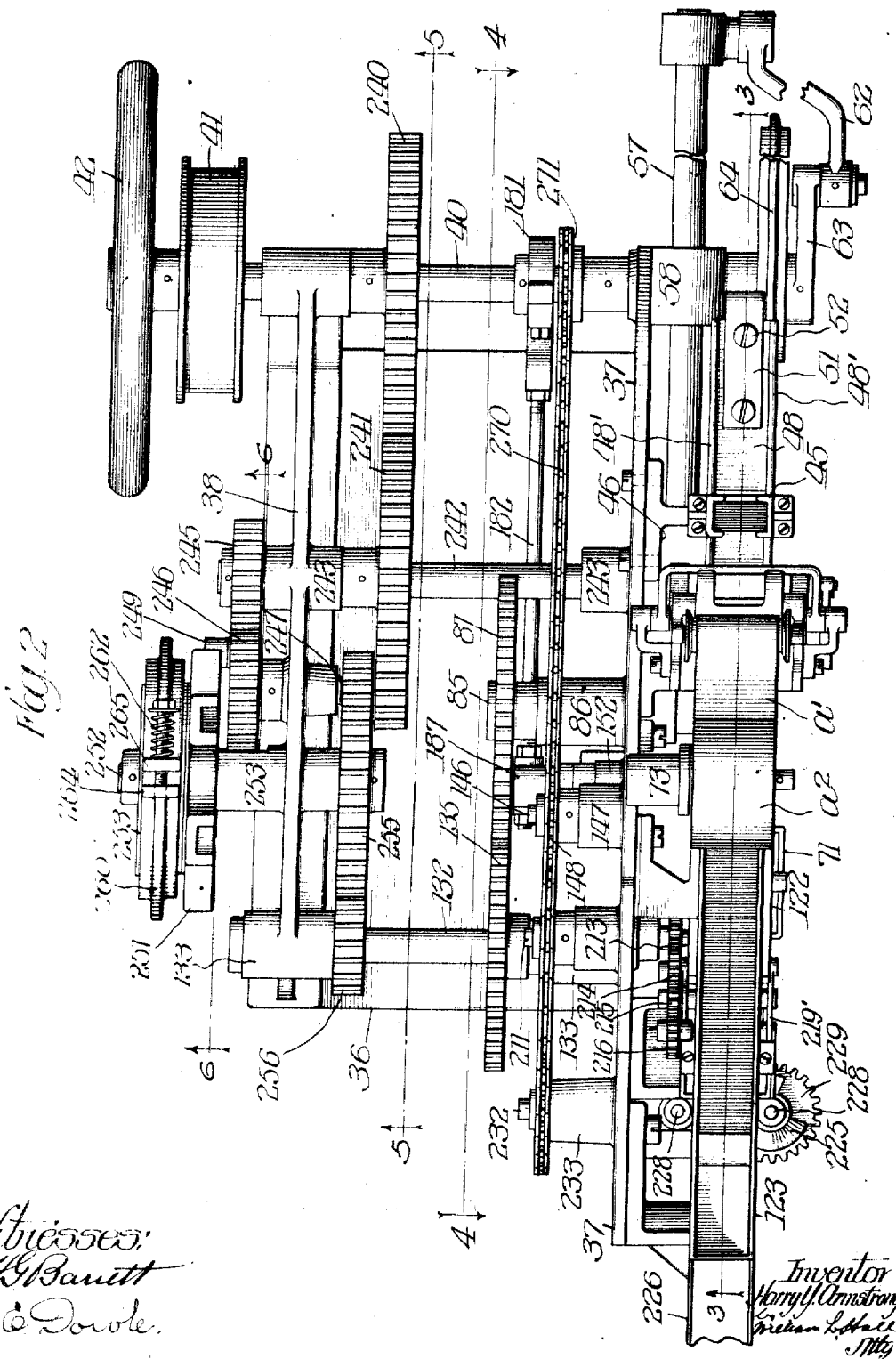

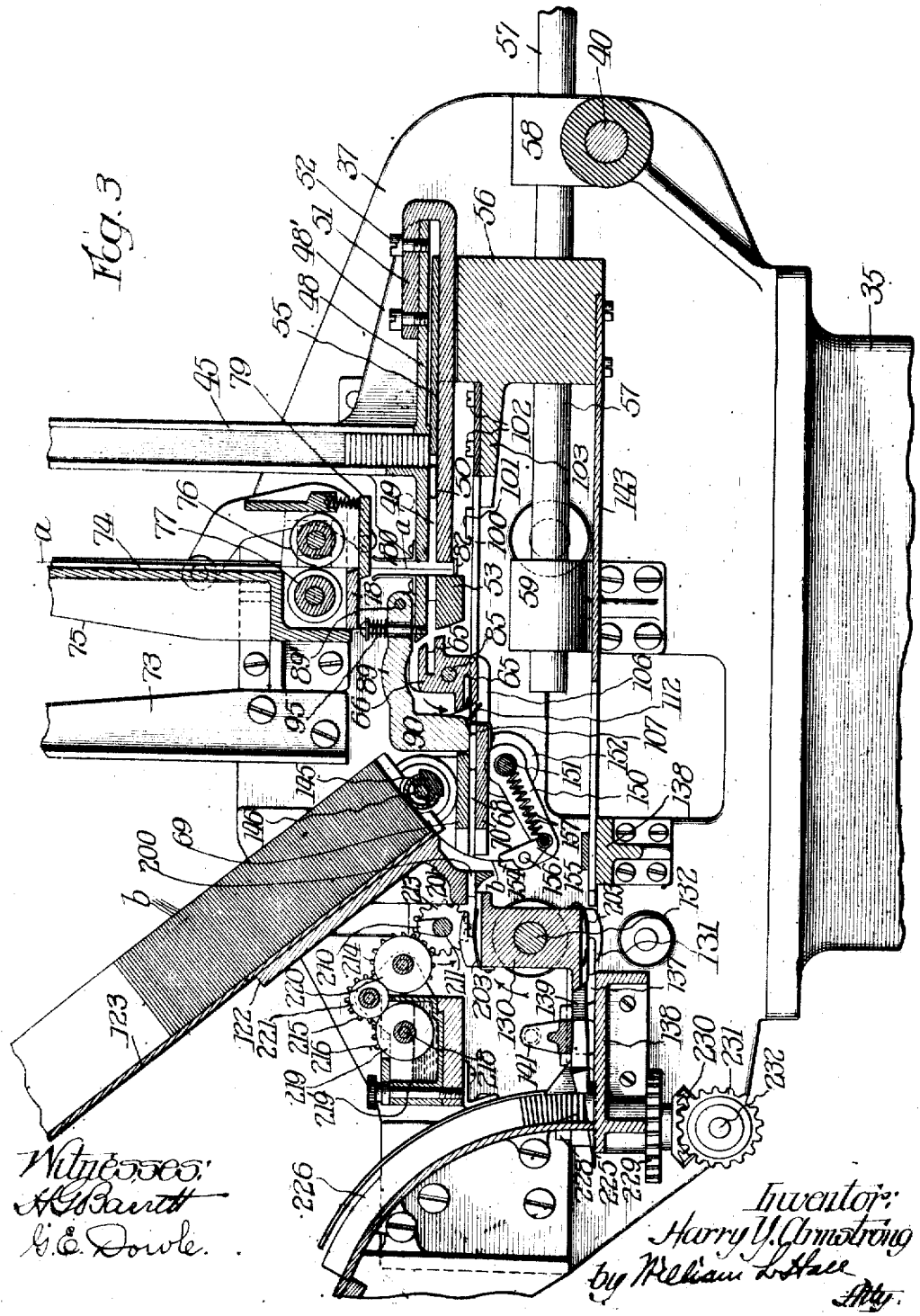

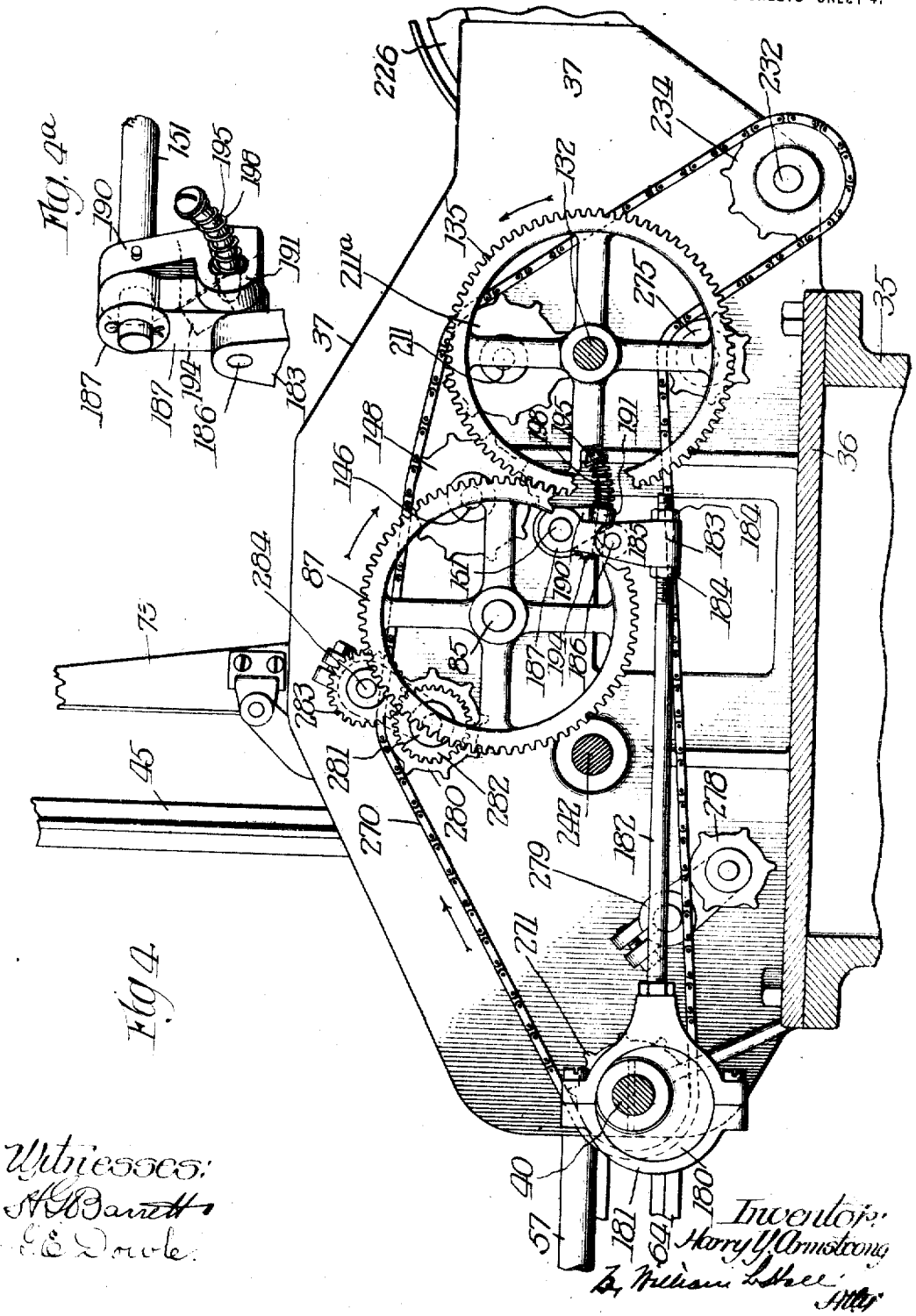

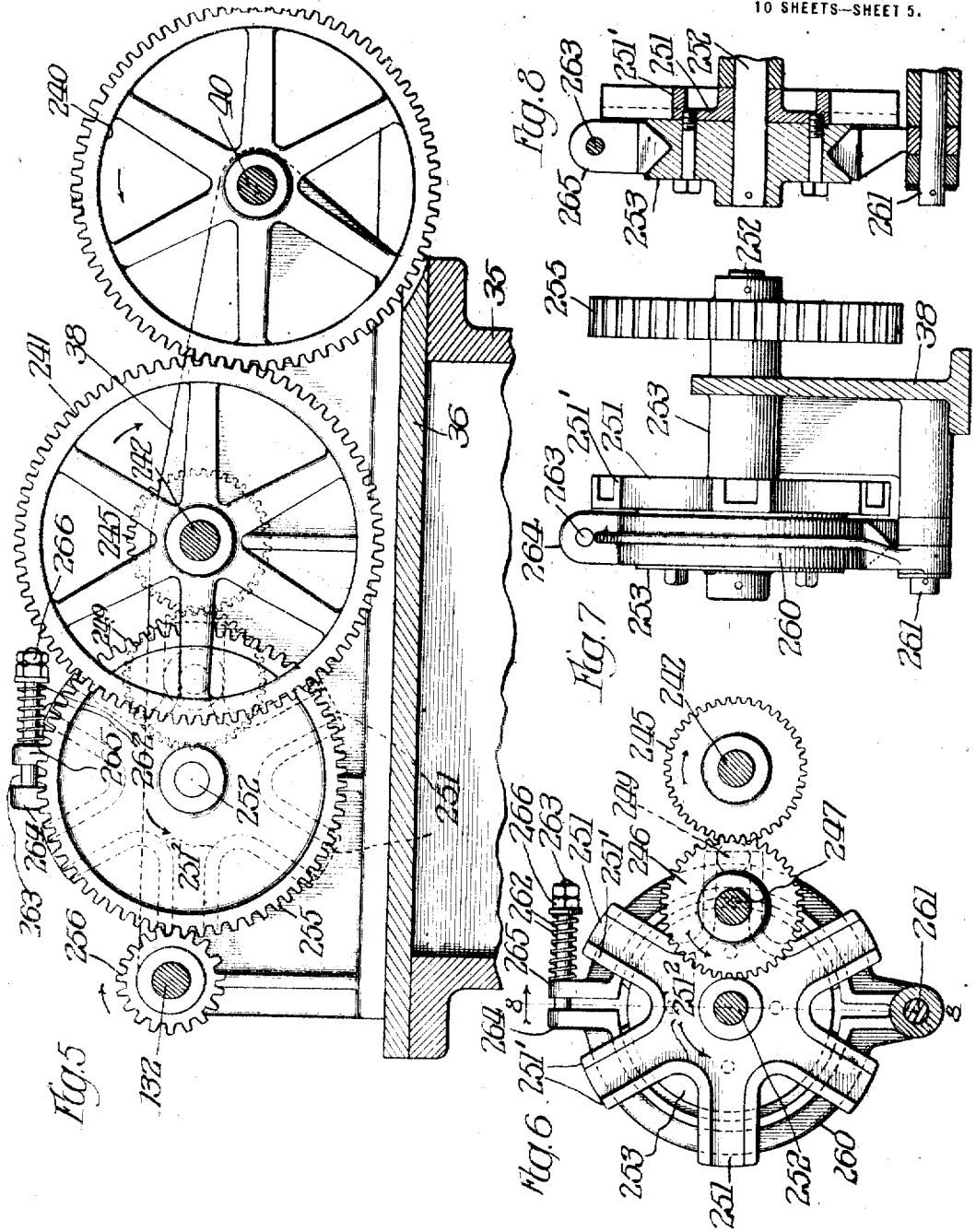

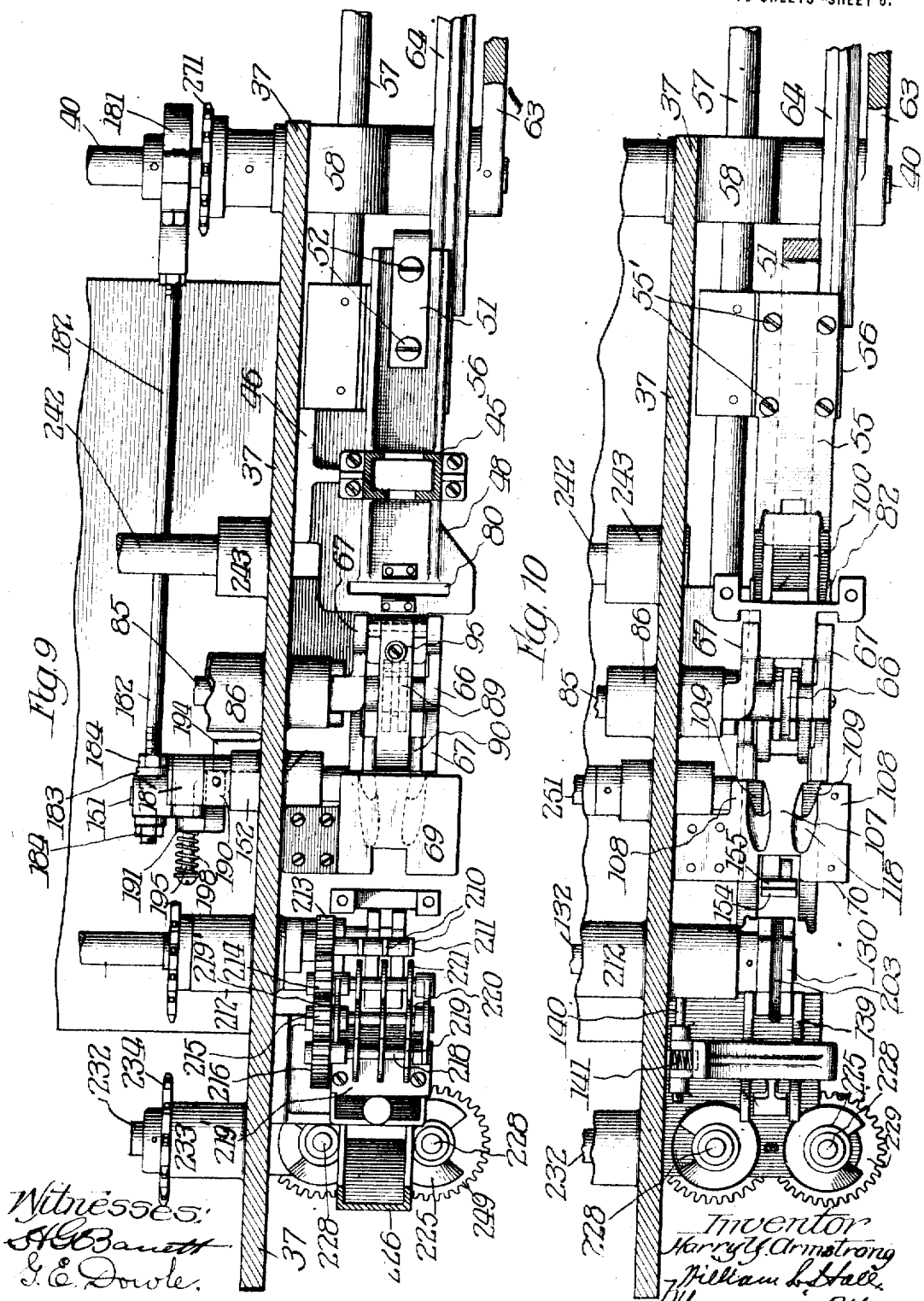

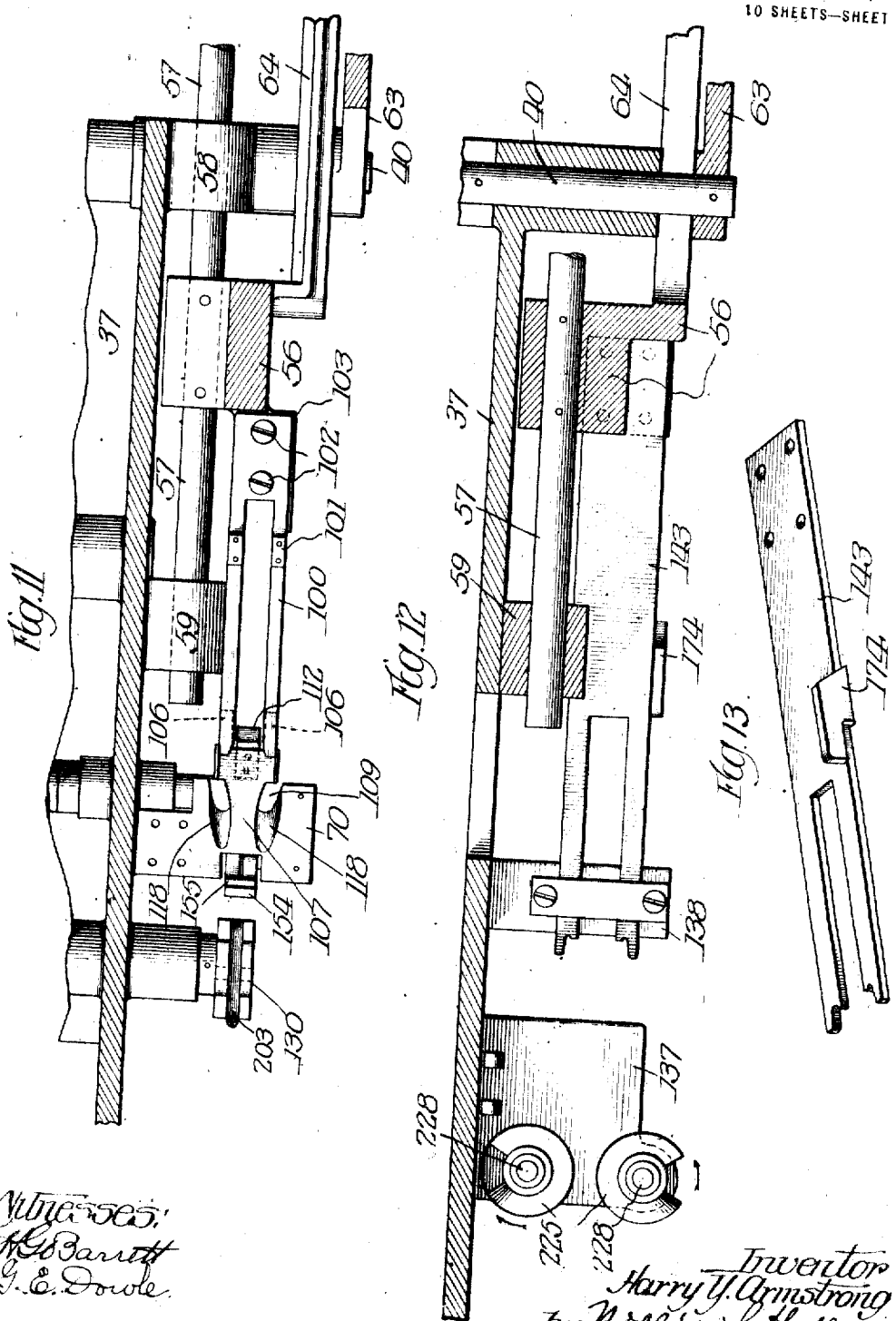

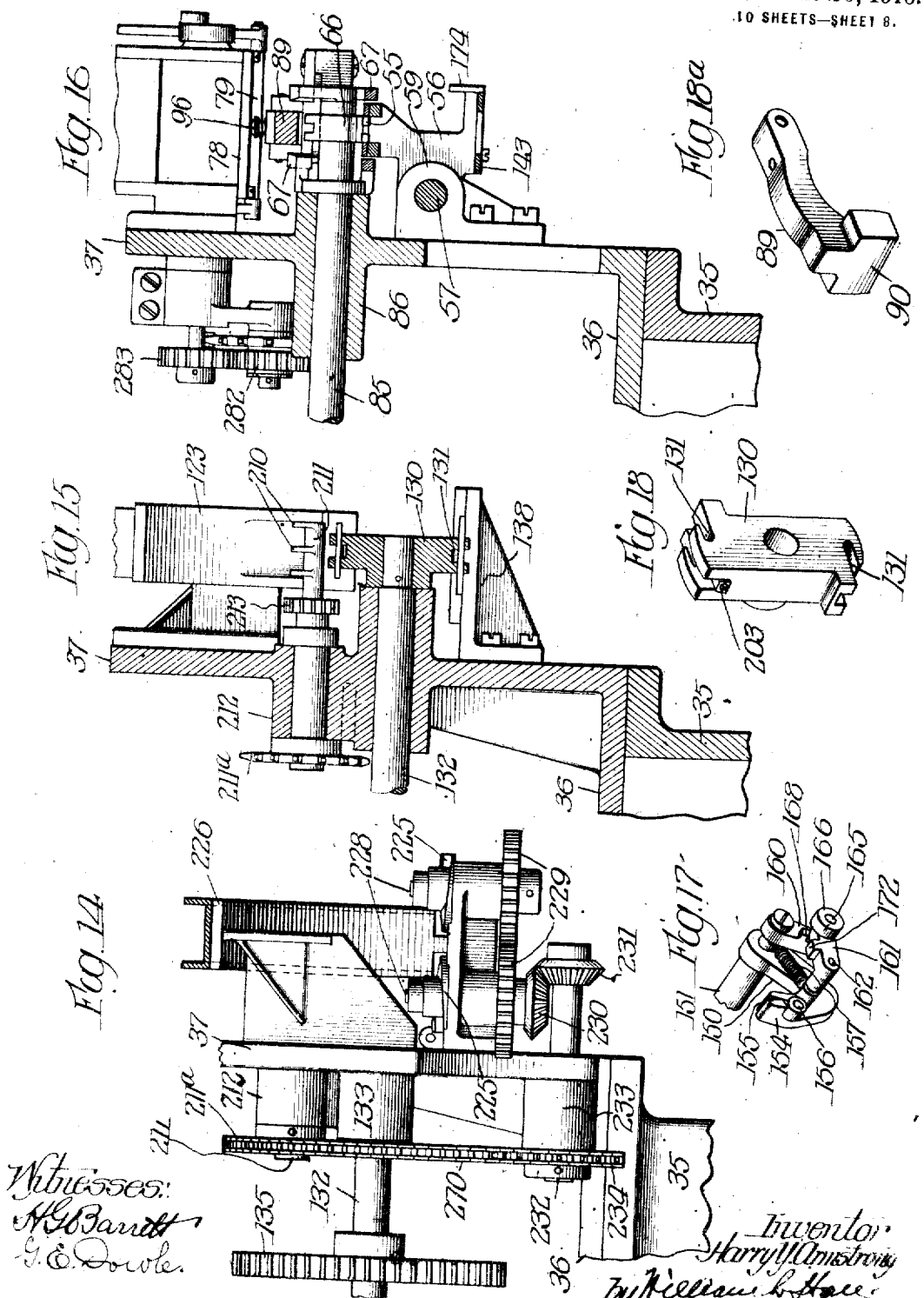

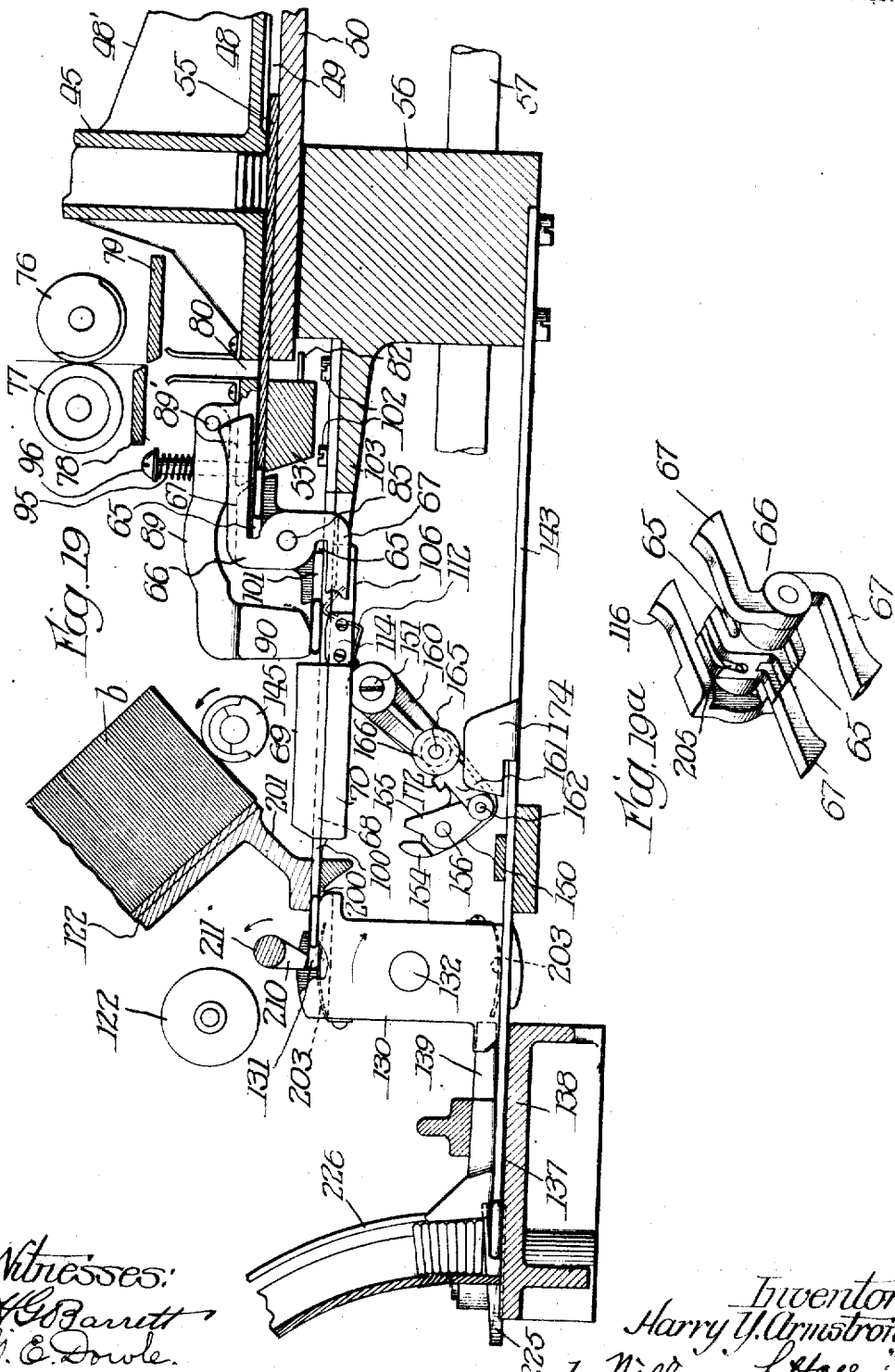

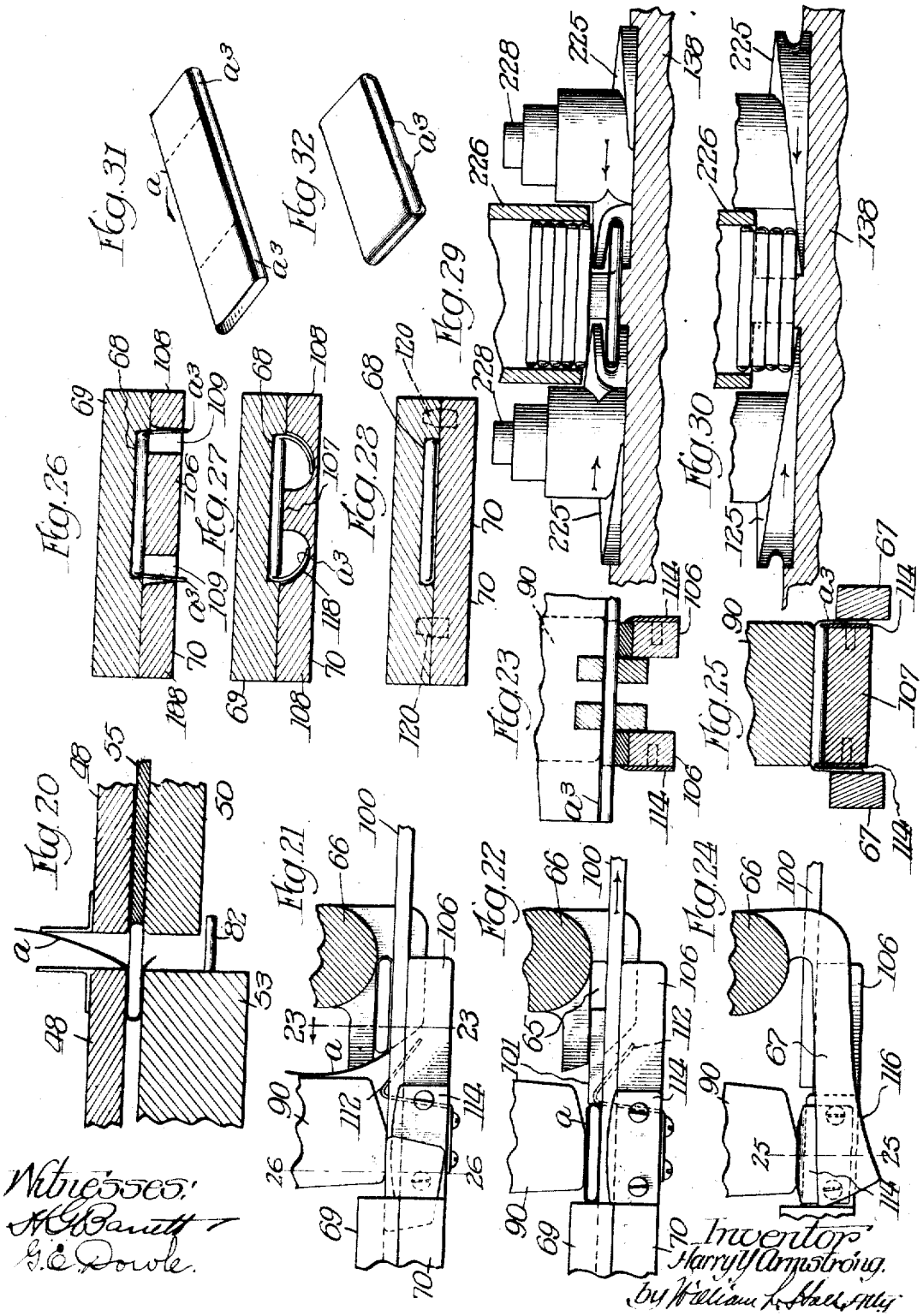

HARRY YARRINGTON ARMSTRONG, OF ELGIN, ILLINOIS, ASSIGNOR, BY MESNE ASSIGNMENTS, TO PACKAGE MACHINERY COMPANY, OF SPRINGFIELD, MASSACHUSETTS, A CORPORATION OF MASSACHUSETTS.

GUM-WRAPPING MACHINE.

1,187,696.  Specification of Letters Patent.  Patented June 20, 1916.

Application filed October 24, 1911. Serial No. 656,504.

*To all whom it may concern:*

Be it known that I, HARRY Y. ARMSTRONG, a citizen of the United States, and a resident of Elgin, in the county of Kane and State of Illinois, have invented certain new and useful Improvements in Gum-Wrapping Machines; and I do hereby declare that the following is a full, clear, and exact description thereof, reference being had to the accompanying drawings, and to the characters of reference marked thereon, which form a part of this specification.

This invention relates to improvements in wrapping machines and refers more specifically to machines designed to wrap articles or cakes, such as chewing gum.

The machine herein shown has been designed for wrapping flat, thin articles, such as cakes of chewing gum, and in the following description the features of construction and operation will be specifically described with respect to a chewing gum wrapping machine, although it will be understood that some of the features of construction may be employed for wrapping other articles.

The machine shown is also designed for wrapping the articles with an inner and an outer wrapper, the inner wrapper being usually a metal foil or a thin, light paper, such as oil paper, and the outer wrapper a heavier paper upon which is printed the label of the article.

Among the objects of the invention is to provide a compact and simple wrapping mechanism which is capable of being operated at high speed to rapidly and efficiently wrap articles, such as cakes of gum.

A further object of the invention is to provide a novel arrangement of wrapping mechanism for first applying an inner wrapper to the article and thereafter applying an outer wrapper thereto, so constructed and arranged that the articles with the inner wrappers applied thereto are carried to the mechanism which applies the outer wrappers by a portion of the mechanism which folds the inner wrappers about the articles.

A further object of the invention is to provide, in a machine for applying two wrappers to an article, an arrangement of plunger devices for advancing the articles, which plunger devices are actuated in unison from a single moving element.

A further object of the invention is to provide a novel arrangement of an intermittently rotative wrapper head arranged to receive the article and wrapper at one side thereof, and, by partial rotation, to carry the article and wrapper into another position to be further operated upon to complete the wrapping of the article.

A further object of the invention is to provide an improved mechanism for discharging the completely wrapped articles from the machine.

Further objects of the invention are to improve and simplify the mechanism of wrapping machines of this character, and the invention consists in the matters hereinafter set forth, and more particularly pointed out in the appended claims.

In the drawings,—Figure 1 is a side elevation of a wrapping machine embodying my invention; Fig. 2 is a top plan view thereof; Fig. 3 is a longitudinal section on the line 3—3 of Fig. 2; Fig. 4 is a longitudinal section on the line 4—4 of Fig. 2; Fig. 4ª is a perspective detail of the yielding actuating mechanism for the wrapper gripper device, hereinafter referred to; Fig. 5 is a longitudinal section on the line 5—5 of Fig. 2; Fig. 6 is a detail section on the line 6—6 of Fig. 2; Fig. 7 is an end elevation of the parts shown in Fig. 6; Fig. 8 is a section on line 8—8 of Fig. 6; Fig. 9 is a horizontal section on the indirect line 9—9 of Fig. 1; Fig. 10 is a section on line 10—10 of Fig. 1; Fig. 11 is a section on line 11—11 of Fig. 1; Fig. 12 is a section on line 12—12 of Fig. 1; Fig. 13 is a perspective view of the plunger for ejecting the finally wrapped gums from the second wrapper mechanism. Fig. 14 is an end view of the machine as seen from the arrow 14 on Fig. 1; Fig. 15 is a vertical section on the line 15—15 of Fig. 1; Fig. 16 is a vertical section on the line 16—16 of Fig. 1; Fig. 17 is a perspective view of the mechanism for operating the outer wrapper gripper device; Fig. 18 is a perspective view of the secondary wrapper head; Fig. 18ª is a perspective view of a bearer member arranged to hold the wrapper upon the gum as it is discharged from the primary wrapper head; Fig. 19 is an enlarged vertical sectional view partly in elevation of the essential features of the wrapper mechanism; Fig. 19ᵃ is a perspective view of the primary wrapper head; Figs. 20 to 28, inclusive, are details illustrating the successive steps of the wrapping operation; Figs. 29 and 30 are details of the mechanism for forcing the wrapped gums from the wrapper mechanism to and through a discharge chute; Fig. 31 is a perspective view of a partially wrapped gum; Fig. 32 is a perspective view of a completely wrapped gum.

The machine is mounted on a base or pedestal 35 having a bed plate 36 on which is formed two upright longitudinal webs or flanges 37, 38, (Fig. 2) to carry the bearings for the various operating shafts, and which support different parts of the machine as will hereinafter more fully appear.

40 is the main driving shaft of the machine mounted in bearings in the webs 37, 38, at the front end of the machine and provided with a pulley 41 through which power is transmitted thereto. The shaft is provided with a hand wheel 42 by which it may be turned or rotated by hand.

The gums to be wrapped are stacked in a vertical hopper 45 (Figs. 1, 2, 3 and 4) supported on a bracket 46 attached to the web 37 (Fig. 2). Formed integral with said bracket 46 is a horizontal plate 48 stiffened by vertical webs 48' and which constitutes the top member of a primary slot or channel section 49 in which the lowermost gum of the stack rests. The lower wall of the slot is formed by a horizontal plate 50 that is attached by the forward hooked end portion 51 to said upper plate 48, as by the screw bolts 52, best shown in Figs. 2, 3 and 9, and a plate or block 53 attached to the forward end of the top of the plate or member 48 of the slot, as best shown in Figs. 1, 2, 19 and 20.

The gums are advanced through the slot 49 from the bottom of the hopper by means of a primary plunger 55 which is attached to the upper side of a block 56, as by the screw 55' (Fig. 10). Said block is arranged beneath the plunger and is fixed to a longitudinally sliding bar 57, arranged at one side of the block 56 to slide in bearings 58, 59 carried by the web 37. The said bar 57 extends forwardly beyond the bearing 58 and is connected by a link 62 to a crank arm 63 fixed to one end of the main driving shaft 40 (Figs. 1 and 2). The said plunger supporting block 56 is provided at its outer side with a guide yoke 64 (Figs. 1, 9 and 10) which embraces and guidingly engages the end of the main driving shaft 40; the said guide yoke and bearings 58, 59 for the reciprocating bar 57 constituting laterally stable guides for the plunger bearing block 56. The gums are forced by said plunger 55 through said slot 49 into the receiving pocket 65 of an intermittently rotating primary wrapper head 66 arranged in rear of the guide slot or channel 49, and shown best in Figs. 1, 3, 19ᵃ and 21, 22, 24 and 25. Said primary wrapper head, as best shown in Fig. 19ᵃ, embraces a central body portion having at its upper and lower sides lugs or extensions in which are formed the pockets 65, and at the ends of which are formed upper and lower pairs of end flap folding arms 67. The pocket 65 at the upper side of the head faces forwardly and is normally in line with the folding slot 49, while the pocket 65 at the lower side of said body faces rearwardly and is in line with a slot 68 formed between upper and lower plates 69, 70 which extend laterally from the web 37, and below the plane of the slot 49 as best shown in Fig. 3. The lower plate 70 is fixed in any suitable manner to the machine frame, as shown in Figs. 10 and 11 and the top plate is pressed upon the lower plate by the spring pressed lever 71, as shown in Fig. 1.

The inner wrappers a are cut from a continuous strip of thin paper a' that is unwound from a roll a² on a reel supported at the upper end of the standard 73 supported on the web 37. Said strip is trained downwardly through a suitable guide groove 74 formed in parts carried by a standard 75, between feed rollers 76, 77 and between a stationary and a movable cutting knife 78, 79, respectively, shown best in Figs. 3 and 19, and thence downwardly through a slot 80 in the upper folding slot plate 48 and into the space between the forward end of the lower wall 50 of the wrapping slot and the block 53. Said wrappers are arrested across the slot 49 by the pin or pins 82 (Figs. 1, 3, 19 and 20). The inner wrapper feeding and cutting mechanism constitutes no part of the present invention and need not be specifically described. When the lower end of the strip is arrested by the pins 82, said lower end of the strip extends across the slot 49, and just before a gum is advanced by the plunger 55 the lower end of said wrapper strip is cut off to form the inner wrapper. When the advance edge of the gum strikes the inner wrapper a it folds the one side of the wrapper about the advance marginal portion of the gum, as shown in Fig. 20, and forces the gum with the wrapper thereon in this position forwardly into the upper pocket 65 of the primary wrapper head 66, as shown in Fig. 19. The said primary wrapper head is fixed to a short shaft 85 mounted in a suitable bearing 86 and is provided with a spur wheel 87, driven in a manner hereinafter described, and as best shown in Figs. 2, 4 and 9. The said primary folding head rotates in the direction indicated by the arrow in Fig. 3, one-half rotation in each movement thereof, and carries the gum and the wrapper partially folded thereon to the lower side of the head, or the position indicated in Figs. 3 and 21, at which time the said gum is just above the plane of the next lower or secondary folding slot 68. While the wrapper head is turning through the half rotation to carry the gum from an upper to a lower level, the trailing side of the wrapper is confined by an L-shaped bearer member 89 (Figs. 1, 3 and 18ª) that is pivoted to the upper plate of the primary slot at 89' and lies with its shorter arm 90 between the primary wrapper head and the secondary wrapping slot to constitute a folding or wrapping device at the entering end of the slot or channel section 68 to fold the trailing side of the wrapper on the gum, and to thereby complete the side fold of the wrapper as the gum and the wrapper are forced beneath the same and into the secondary wrapping slot 68 by the means hereinafter described. (See Fig. 21.) The member 89 is pressed downwardly by a spring 95 which encircles a screw bolt 96 that extends through the longer arm of said member into the plate 48, the spring being interposed between the head of said bolt and the upper side of said longer arm.

After the partially wrapped gum has been delivered by the rotation of the wrapper head 66 into the position shown in Figs. 3 and 21, the partially wrapped gum is discharged from the lower pocket of the wrapper head into and through the secondary wrapping slot 68, and thence to the mechanism for applying the outer wrapper thereto, by means of a secondary plunger device comprising a bar 100 (Fig. 11), bifurcated at its rear end, and provided on its upper side between its ends with lateral shoulders 101 embracing blocks attached thereto. The bar 100 is arranged slightly below the horizontal plane of the lower pocket 65 of the wrapper head 66, and in the plane of the secondary wrapping slot 68, while the shoulders 101 are arranged in the plane of said pocket, but above the plane of the secondary wrapping slot 68.

The plunger bar 100 is shown as attached at its forward end, as by means of the screws 102, to a rearwardly and laterally projecting lug 103 of the sliding block 56, whereby the secondary plunger bar travels in unison with the primary plunger. The lateral members of the rear end of the secondary plunger bar 100 extend on opposite sides of the lower pocket 65 of the wrapper head, or between the ends of said pocket and the folding arms 67, and said lateral members of the plunger bar rest and slide upon laterally separated arms 106 which extend forwardly from a central folding horn 107 of the lower plate 70 of the secondary wrapping slot, the rear ends of said plunger bar members being thus supported in its extreme forward position. Said plate 70 is also provided, at the sides of the central folding horn, with side horns 108, 108, separated from the central horn by spaces 109. The central horn extends a distance forwardly of the side horns as shown in Figs. 11 and 3.

The mechanism thus far described constitutes means for applying the inner wrapper about the gum, or a single wrapper about the gum, if but one wrapper be employed. The operation of said mechanism may be stated as follows: The individual gums are forced from the lower end of the stack in the hopper 45 as the plunger 55 moves rearwardly and said gum is carried by the plunger 55 across and in contact with the wrapper "a" and into the upper or receiving pocket 65 of the wrapper head 66. This movement of the gum and wrapper folds the wrapper about the advance side of the gum. The wrapper head 66 then turns rearwardly one-half of a rotation, as the machine herein shown is designed, to deliver the partially wrapped gum to the lower side of said head, and in a plane slightly above the plane of the secondary wrapping slot 68. This position is illustrated in Fig. 21, and it will be noted that the trailing edge of the wrapper $a$ is confined by the shorter arm 90 of the presser member 89 so that said trailing edge will be properly folded about the gum when the latter and wrapper are forced beneath the arm 90 and thereafter through the slot 68. While the wrapper head has been thus partially rotated, the plunger 55 is retracted to bring another gum to the upper receiving pocket 65 of the head in its next feed movement of the plunger. During the next rearward or feed movement of said plunger 55 the secondary plunger device, consisting of the bar 100 and shoulders 101, which travels in unison with and in the same direction as the plunger 55, is moved rearwardly to bring the shoulders 101 thereof into contact with the ends of the gum which project beyond the sides of the lower or discharge pocket 65 of the wrapper head. This movement of the lower plunger device discharges the lower gum from said head upon the lateral arms of plunger bar 100 and forces same beneath the pressure device 90. Such position of the parts is shown in Figs. 19, 22 and 23. At this time the intermediate portion of the wrapper is fully folded about the gum, as shown in said last mentioned figures and in Fig. 31, with the end flaps $a^x$ of the wrapper projecting beyond the gum. Upon the next retraction of the secondary plunger bar 100, the said bar moves from under the partially wrapped gum, so that the gum drops off the plunger bar upon the central folding horn 106, assisted by the pressure of the member 89, into the plane of the secondary wrapping slot and in position to be forced through said latter slot in the next rearward movement of the plunger bar 100. In order to prevent the partially wrapped gum from being carried backwardly after it has been deposited upon the plunger bar 100 and during the retraction of the latter bar, I may provide the spring device 112 which is attached, as best shown in Figs. 3, 21 and 22, to the central folding horn 107, and arranged to permit the partially wrapped gum to be readily forced beneath the presser member 89, as shown in Fig. 19, but to spring up in front of the gum and prevent its retraction in the retracting movement of the plunger bar.

Figs. 24 and 25 indicate the completely retracted position of the plunger bar 100, and show the partially wrapped gum supported directly on the central folding horn 107. During the time the plunger bar 100 is being retracted, the wrapper head 66 turns forwardly to deliver another partially wrapped gum from the upper to the lower side of the head, and at the same time one pair of the folding arms 67 of the wrapper head is swung downwardly past the lateral faces of the central folding horn 107 and at right angles to and against the projecting end flaps $a^3$ of the wrapper, so as to fold said flaps downwardly at right angles to the central folding horn, on which they are at this time resting, into the position indicated in Figs. 24 and 25.

In order to give a permanent crease to the flaps on the lines about which they are folded, the lateral sides of the central folding horn are provided with creasing blades 114 which are sharpened at their upper edges and extend above the upper face of the central folding horn. The said edges of the creasing blades are longitudinally curved as shown in Figs. 22 and 24, and the margins of the folding arms 67 which directly coöperate with said creasing blades are in a like manner curved as indicated at 116. This curvature of the creasing blades and folding arms enables the end flaps to be folded flat against the package, without any tendency of bunching or irregular folding of the flaps, and therefore provides a permanent fold of the flaps against the package. After the flaps $a^3$ have been thus folded down, the package is advanced through the folding slot 68, the downturned end flaps $a^3$ of the package passing into the spaces 109, between the central and side folding horns, as indicated in Fig. 26. The inner or adjacent sides of the side folding horns are transversely curved, as shown at 118 in Figs. 10 and 27; the curvature being deepest toward the forward portion of the horns and gradually disappearing toward the rear portion thereof. This character of the curve gradually brings the downturned flaps flat up against the under side of the package to the position indicated in Fig. 28 to produce the final single wrapped package illustrated in Fig. 32.

A yielding pressure is maintained on the upper plate 69 of the secondary wrapping slot so as to accommodate the slot to gums and wrappers of slightly varying thickness. As herein shown, the upper plate 70 may be interlocked with the lower plate by means of dowel pins 120 (Fig. 28), and the plate may be yieldingly pressed downwardly upon the lower plate by means of the L-shaped lever 71, one arm of which bears against the top of said plate 69, and the other arm of which is pivoted at 121 of a support 122 for an outside wrapper magazine 123, hereinafter to be described. A spring 124 stretched between the outer end of the longer arm of the presser lever and a suitable pin on the support 124 above referred to maintains a yielding pressure on the plate 69; and the arrangement permits the upper plate to be readily removed in case the secondary wrapping slot should become clogged.

It will be noted that the plunger bar 100 and the blocks 101 constitute, in effect, a plunger device having staggered or off-set faces, one plunger face, to wit, the rear ends of the blocks 101, constituting means to remove the partially wrapped gums from the wrapper head 66 to the initial end of the slot or channel section 68 or beneath the spring pressed member 90, and the other plunger face, to wit, the rear ends of the plunger bar arms, constituting means to advance the wrapped gums through the slot or channel section toward and into the folding mechanism for applying an outer or label wrapper to the wrapped gum. In other words, one plunger face operates, upon the feeding movement of the plunger mechanism, to feed the article (the gum and wrapper as herein shown) a given distance toward the label wrapper folding mechanism, while the next succeeding feeding movement of the plunger mechanism serves to feed the article farther toward and into said latter folding mechanism. The arrangement of the staggered or off-set faces has the advantage that thereby two articles are fed one in advance of the other and at a given spaced distance apart, as shown in Fig. 19, so that thereby the unitary device constitutes, in effect, two plunger devices, operated from one source of power, just as the plungers 55 and 100 are likewise operated from one source of power. Moreover, the articles are thus fed step by step through shorter distances than if a single plunger device were made to feed an article through the entire distance by one stroke. Thus the stroke of the plunger mechanism is shortened, which contributes to the simplicity of the plunger actuating devices. So far as the broader features of this phase of the invention is concerned, the plunger mechanism having staggered or off-set faces shown may be otherwise adapted to feed articles through the machine to be thereby wrapped in specifically different manner than in the particular combination herein shown.

As before stated, the machine here shown is designed for wrapping the individual articles with a thin, light paper, such as oil paper, and also with a second or outer wrapper to confine the folds or flaps of the inner wrapper. This outer wrapper is, as herein shown, only of a width equal to the length of the gum and has no end flaps or folds, and the mechanism for applying said outer wrapper embraces means only for folding the wrapper about the sides and lateral edges of the gum.

Referring now to the mechanism for applying the outer wrapper, the same is made as follows:

The gums wrapped with the inner wrappers are discharged from the secondary wrapping slot 68 into the upper receiving pocket 131 of a wrapper head 130, which is located in the rear of said wrapping slot 68, and is intermittently operated substantially like the wrapper head 66. The upper and lower pockets 131, 131 of the wrapper head 130 face in opposite directions, so that when the pocket at the upper side of the head is in position to receive a gum and an outer wrapper, the lower pocket holds a gum and wrapper in position to be discharged therefrom. The said secondary wrapper head 130 is mounted on or fixed to a shaft 132, which is rotatively mounted on suitable bearings 133, 133 on the machine frame. As herein shown, and as will hereinafter be described, the shaft 132 is intermittently rotated from a suitable son e of power and is provided with a spur wheel 135 which meshes with the spur wheel 87 of the shaft 85 of the primary wrapper head, so that both of said wrapper heads are intermittently rotated in unison, but, as herein shown, in opposite directions. The upper pocket 131 of the secondary wrapping head 130, is directed toward and receives the wrapped gums from the secondary wrapping slot and is in the horizontal plane of said slot when the head assumes the position shown in Figs. 3 and 19. The lower pocket 131, which constitutes a discharge pocket, is at such time located in line with a tertiary or final folding slot 137, formed between a fixed lower and a yielding upper plate 138 and 139, respectively. Said upper plate 139 may be mounted to yield toward and from the lower plate in any suitable manner. As herein shown it is hinged on a horizontal hinge rod 140, (Fig. 10) mounted in any suitable manner on the machine frame. The said plate 139 is shown as placed under the influence of a spring 141, indicated in dotted lines in Figs. 1 and 3, and in full lines in Fig. 10, to hold the plate pressed upon the lower plate 138. The position of the upper or receiving pocket 131 of the secondary wrapper head 130 is such that the gum, wrapped with the inner wrapper, is forced, together with an outer wrapper, into the bottom of said pocket 131. Thereafter the said head is rotated one-half, or other desired part of rotation, to bring the gum theretofore delivered therein to the lower side of the head, and in line with the said tertiary wrapping slot 137. From said lower pocket 131 of the head 130 gum is forced by the plunger 143 into the tertiary wrapping slot, which plunger is attached to the lower end of the block 56 and is bifurcated at its rear end, with the lateral members thereof passing on opposite sides of the secondary wrapper head 130. The plunger 143, therefore, is moved in unison with the plungers 100 and 55.

Between the secondary wrapping slot 68 and the secondary wrapper head are located means for presenting an outer or label wrapper "b" into the path of the gum and its inner wrapper. The mechanism herein shown for effecting this result is made as follows: The said wrappers "b" are contained in a confined bundle in the obliquely arranged magazine 123, above referred to, which is fixed to the machine frame in any suitable manner, by means of the supporting plate 122, and the forward, lower end of the magazine is located above the plates 69 and 70 between which is formed the secondary wrapping slot 68. The wrappers are stripped, one at a time, from the confined group in the magazine 123 by means of a stripping roller 145, which is fixed to a shaft 146, that is rotatively mounted in a bearing 147 on the machine frame. Said shaft is provided with a sprocket wheel 148 through which it is operated by power devices which will hereafter be described. The said stripper roller 145 operates to direct the outer wrappers, one at a time, across the rear end of the secondary folding slot, as shown in Fig. 3. The said stripper roller, as the machine shown is organized, is not relied upon, however, to deposit the outer wrapper across the folding slot, but I provide means for positively drawing the wrapper down to the proper position, operating in the manner of a nipper to seize the lower margin of the wrapper to draw the same away from the group in the magazine. The construction of such wrapper manipulating device and the manner of its operation will now be described.

150 designates an arm that is fixed to a rock shaft 151 which is mounted on a suitable bearing 152 on machine frame. Said arm extends rearwardly from said rock shaft and terminates in an upwardly and rearwardly extending jaw 154. 155 designates a second, swinging jaw that is pivoted at 156 to the fixed jaw, and a spring 157 (Fig. 3), attached to the tail of the swinging jaw and to the rock shaft 151, tends to hold the ends of the jaw in position to grip a sheet of paper, as indicated in Figs. 1, 3 and 17. The said jaws are adapted to be opened by a toggle lever arrangement which is best shown at Figs. 1, 17 and 19, and is made as follows: 160 designates a lever which is pivoted at one end to the rock shaft 151, or to a screw mounted axially therein. 161 designates a second lever that is pivoted at one end to a pin 162 that extends laterally from the tail of the swinging jaw and to which one end of the spring 157 is attached. The said toggle arms 160 and 161 are pivotally connected together at their adjacent ends by means of a pin 165, which pin is herewith shown as provided with a roller 166, for a purpose hereinafter to be described. When the toggle lever arrangement described is broken downwardly, as shown in Figs. 1 and 17, the spring 157 acts on the swinging jaw to swing said jaw to its closed position, or in position to coöperate with fixed jaw to grip the lower margin of the outer wrapper $b$. The swinging ends of the toggle levers are adapted to be swung upwardly, by means hereinafter described, to straighten the toggle, as shown in Fig. 19, so as to thereby act through the toggle levers on the movable jaw to swing it to its open position. The latter or straightening movement of the toggle is limited by means of a stop or lug 168 on the toggle lever 160 (Fig. 17) adapted to engage the adjacent end of the other toggle lever 161. When said toggle levers are thus straightened, the axis of the pivot pin 165 is in a plane slightly above a plane passed through the axes of the pivot pins at the outer ends of the toggle levers. When the toggle levers are broken down, as shown in Figs. 1 and 17, the axis of the pivot pin 165 is below a plane passed through the axes of the pivots at the outer ends of the toggle levers. Therefore, the spring 157 serves to maintain the swinging jaw in its open position, as well as in closed position.

The rock shaft 151 of the gripper device is oscillated by means hereinafter to be described and swings the gripper device up and down, regardless of whether the jaws are opened or closed, the swinging movement of the device having no effect, in itself, on the position of the jaws. Thus when a wrapper is to be delivered from the magazine by the stripper roller 145, with the parts shown in the positions assumed in Fig. 19, after the lower edge of the wrapper passes a sufficient distance below the magazine, the gripper device is swung upwardly toward the lower edge of the partially delivered wrapper, as permitted by the notched rear ends of the plates 69 and 70 of the secondary wrapping slot and until the advance edge of the wrapper passes between the jaws. In order to close the jaws upon the wrapper at this time, I provide one of the toggle levers with a striking lug 172 which, when said swinging gripper device reaches its uppermost position, strikes the under plate 70 suddenly and breaks the toggle downwardly thereby permitting the spring 157 to quickly close the jaws upon the advance edge of the wrapper. Thereupon the shaft 151 is rocked in a direction to swing the gripper device downwardly, thus pulling the wrapper into the path of the wrapped gum as it is directed from the secondary wrapping slot to the receiving pocket of the secondary wrapper head, as best shown in Fig. 3. Just before the gum strikes the wrapper thus placed across its path, the roller 166 on the end of the pivot pin 165 is struck by a lug 174 which rises from the tertiary plunger 143 and again straightens the toggle so as to open the jaws to release the wrapper, as best shown in Fig. 19.

It is desirable to provide means for adjusting the throw of the swinging gripper device to the length of the wrappers, to the distance which the wrappers are fed down by the roller 145, and also to the location of the printed labels on the wrappers. It is also desirable that the gripper jaws shall swing upwardly toward a wrapper a distance slightly greater than necessary to properly engage a wrapper forced downwardly the average distance by the stripper roller 145. I have herein shown means for thus effecting a variable stroke or movement of the swinging gripper device from a constant rotation of the driving shaft 40, by which the gripper device is operated. The mechanism for effecting this result is made as follows: 180 designates an eccentric that is fixed to the driving shaft 40, and 181 designates an eccentric strap provided with an eccentric rod 182, which extends rearwardly from the driving shaft. (Figs. 4 and 9). Mounted on the rear end of the eccentric rod is a sleeve 183, which is adapted to be adjusted longitudinally along said rod and to be held in different adjusted positions thereon by means of and between the nuts 184, 184, screw-threaded to said rod. Said sleeve is provided with an upstanding lug which is pivoted at 186 to the lower end of an arm 187, which is swingingly mounted in any suitable manner on the rock shaft 151 that carries the wrapper gripper device, said member 187 being on the side of the frame web 37 opposite to said gripper device. Fixed to the shaft 151, between said swinging arm 187 and the bearing 152, as by means of the pin shown, is a fitting 190 which is provided at its rear side with a laterally extended lug 191 that overlaps the rear side of the freely swinging arm 187. Said fitting 190 is adapted for engagement at the forward limit of its movement with a stop lug 194 which extends laterally from the web 37 in front of said fitting. 195 designates a screw bolt which extends through an opening in the lug 191 as indicated in Fig. 4 and enters and has screw-threaded engagement with an opening in the swinging member 187. Surrounding said screw bolt 195, and interposed between the head of said bolt and the lug 191, is a spiral expansion spring 198, which tends normally to hold the said lug 191 engaged with the rear side of the swinging arm 187. With this construction, when the eccentric rod is moved forwardly by the eccentric 180, it acts, through the lugged sleeve 183, the swinging arm 187 and the lugged fitting 190 to swing the rock shaft 151 rearwardly and to thereby swing the gripper device upwardly into position to engage and grip the wrapper, or in the position shown in Fig. 1. During the rearward movement of the eccentric rod the swinging gripper device is swung downwardly, through the medium of the parts described, and this downwardly swinging movement continues until the fitting 190 strikes the stop lug 194. Thereupon the rock shaft and the swinging gripper device are arrested, but, if the throw of the eccentric has not been completed or taken up, the spring or yielding connection between the arm 187 and the fitting 190, afforded by the screw bolt 195 and spring 198, permits the movement of the eccentric and eccentric rod to continue without imparting movement to the rock shaft of the swinging gripping device, the compression of the spring taking up the idle movement of the eccentric. At such time the swinging arm 187 will move away from the fitting 190. With this construction, by adjusting the eccentric rod sleeve 183 toward the free end of the rod, the gripper device will be moved upwardly a correspondingly greater distance toward the wrapper b, but the gripper device will not in its return movement swing a corresponding distance below its mid or central position, but will remain stationary after the fitting 190 engages the stop lug 194, and the spring 198 absorbs or takes up the remaining portion of the movement of the eccentric. If the sleeve 183 be adjusted on the concentric rod toward the driving shaft 40, the upward swing of the gripper device will be shortened.

The package and outer wrapper, when the package strikes the outer wrapper, are forced through a short slot 200, (Figs. 3 and 19) in line with the secondary wrapping slot, that is formed in a depending part 201 of the magazine support 122, so that said wrapper when being forced through the slot is folded about the advance margin of the package, and the package thus partially wrapped in the outer wrapper is forced into the upper pocket 131 of the secondary wrapper head 130. A spring 203 may be placed in each of the pockets 131 in the manner shown in Figs. 3, 18 and 19 to hold the wrapper pressed to the package and hold the package in the pocket, the notched portion of the head being slotted to receive said spring. The notched portions of the primary wrapper head may be likewise provided with light springs 205, as shown in Fig. 19ª to hold the gums and wrappers within the head and to hold the wrapper flat thereon. While the package with the outer wrapper thus partially folded thereon occupies the upper or receiving pocket 131 of the secondary wrapper head, paste is applied to one margin of the wrapper through the medium of paste fingers 210 (Figs. 3, 9 and 15) mounted on a shaft 211 which is mounted in a bearing 212 formed on the web 37 of the machine frame. This shaft is geared through a train of gears 213, 214, 215 and 216 to a shaft 218 having a series of disks 219 that rotate in the paste pot 219' and from which the paste is applied to the fingers 210, through the medium of the intermediate disks 220 and 221. The trailing edge of the wrapper is folded upon the margin to which the paste is thus applied during the rotation of the secondary wrapper head 130 in the direction indicated by the arrow in Fig. 3, at which time said trailing edge of the wrapper is pressed against the pasted edge by engagement of the depending portion 201 of the magazine support, and the parts of the wrapper are further pressed together when the completely wrapped package is forced into the tertiary wrapping slot 137. The completed package is forced by the tertiary plunger 143 through the tertiary wrapping slot and between a pair of right and left hand screws 225, 225, arranged at the rear end of said latter slot, and at the base of an upwardly and rearwardly curved discharge chute 226, as best shown in Figs. 1, 3, 14, 29 and 30 by which the completed packages are discharged from the machine. Figs. 29 and 30 illustrate the manner in which the oppositely disposed screws elevate the packages and lift them into and force them through said discharge chute. The lifting screws 225 are mounted on vertical shafts 228, 228, provided at their lower ends with intermeshing gears 229, 229. One of said shafts is provided with a beveled pinion 230 that meshes with a beveled pinion 231 of a short, horizontal shaft 232, mounted in a bearing 233 (Fig. 14) carried by the web 37 of the frame. Said shaft is provided with a sprocket gear 234 whereby it is operated in a manner hereinafter described.

The shafts 85 and 132, which carry the primary and secondary wrapper heads 66 and 130, respectively, are shown as operated in unison from the main shaft 40, by means which impart to the wrapper heads an intermittent rotary movement. As herein shown said wrapper heads and their shafts are rotated one half a rotation during each intermittent movement thereof, and such range of angular movement will prevail where each wrapper head is provided with two receiving and two discharge pockets. Said wrapper heads may be provided with more than two pockets, arranged in multiples of two, and the range of intermittent movement of the wrapper heads and their shafts will correspondingly vary. The means for operating the wrapper heads and the wrapper head shafts is generally like the construction shown in my prior Patent No. 1,045,102, granted November 19, 1912, and embraces the following mechanism: The driving shaft 40 is provided with a gear wheel 240 which meshes with a gear wheel 241, that is fixed on a shaft 242 which is rotatively mounted in bearings 243, 243 made integral with or carried by the webs 37, 38 of the machine frame. Fixed to one end of the said shaft 242 is a pinion 245, which meshes with a gear wheel 246, which is fixed to a short shaft 247, which is mounted in a bearing carried by frame member or web 38. Said gear wheel 246 is provided near its periphery with a stud 249, that is adapted to travel in the channeled tracks of a track member 251 that is fixed in a short shaft 252 mounted in a bearing 253 carried by or made integral with the frame member or web 38. The said track member 251 is shown as formed with six tracks bounded by the ribs or flanges 251', 251'. The tracks are shown as open at their outer ends, and adjacent tracks are connected at their inner ends by the curved portions 251². Fixed to said shaft 252, and rotating with the channeled track member 251, is a disk 253 best shown in Figs. 2, 5, 6, 7, and 8. The said shaft 252 carries at its end remote from disk 253, a gear wheel 255 which meshes with a pinion 256 that is fixed to and rotates with the shaft 132, of the secondary wrapper head. The driving shaft 40 is rotated continuously in one direction, and operates through the medium of the gear wheels 240, 241, the shaft 242 and the pinion 245 to rotate the gear wheel 246 continuously in one direction. The stud carried by the gear wheel 246, is therefore revolved continuously in one direction. During substantially one half of the revolution, of the stud, in the arrangement herein shown, the said stud passes from a point at the inner end of one of the tracks of the track member 251, to the outer end of said track and thence backwardly through the latter track to impart to said track member and shaft 252, a partial rotation in the direction indicated by the arrows in Figs. 5 and 6, as in the construction shown in my Patent No. 1,045,102, granted November 19, 1912, and thereby imparts corresponding angular movement to said wrapper heads 66 and 130. The speed of the shaft 252 is greatest while the stud 249 is traveling through the outer ends of the channeled tracks, and such speed gradually decreases as the stud approaches the inner ends of the tracks. Said shafts and the wrapper heads, are finally brought to rest, to effect a pause or dwell of the shafts and heads as the stud 249 passes around the curved connecting portions 251² of the flanges or ribs 251' which bound the channeled tracks. During such time as the stud 249 is engaged with the curved connecting rib or flange of the track member, the said curved portion of the flange is substantially concentric with the axis of rotation of the gear wheel 246 so that, as a result, said stud imparts no movement to said member or shaft 251. As soon as the stud 249, leaves the concentric portion of the curved ribs or flanges 251', and moves outwardly in the next rear channeled tracks, rotary movement of the track member and the shaft 252 begins and continues while the stud is traveling outwardly through the channeled track to the outer end thereof and thence inwardly to the inner end of the latter track. It will thus be seen that the track member and shaft 252, are brought to a gradual stop or pause, and the movement of said track member and shaft is gradually resumed after such pause and the speed thereof is gradually thereafter accelerated.

By reason of the connection of the shaft 252, through the gear wheel 255 and pinion 256 with the secondary wrapper shaft 132, and of the connection of the latter shaft, through the gear wheels 135 and 87, with the shaft 85 of the primary wrapper head, it will be seen that the said shafts and the wrapper heads are intermittently rotated in unison, and that the wrapper heads are gradually brought to rest in position for the pockets of one side of the heads to receive a gum and wrapper, as shown in Figs. 1, 3 and 19, in which positions one of the pockets of each head is in position to receive the gums and wrappers at the upper sides of the heads, the gums and wrappers being discharged from the other or lower pockets of said heads. After a gum and wrapper has been received by the upper pocket of each head and another gum and wrapper has been discharged from the other or lower pocket thereof, the said head is gradually brought to motion as the stud 249 leaves the concentric portion of the track and passes into an adjacent portion of the track. The said wrapper heads remain at rest while the stud 249 is passing around the concentric portion of the track flanges or ribs.

The ratio of the gear wheel 255 and pinion 256 is such, with respect to the number of tracks in track member 251, as herein shown, that during the time that stud 249, passes from the inner end of one channeled track to the outer end thereof and from said outer end of said track member to the inner curved portion 251² thereof, the wrapper heads will rotate through one half of a rotation, or from a position in which a gum and wrapper is received by the upper pocket of each head and is turned to a position in which the gum and wrapper is discharged from the lower side of the head. It will also be observed, from the arrangement shown, that the wrapper heads are brought gradually to a state of rest, and are likewise gradually brought from a state of rest to motion.

In order to prevent the disk 253 and the track member 251 from overrunning, said disk may be peripherally grooved and the grooved portion engaged by a brake device 260 which comprises two members that are pivoted at one side of the disk to a stud 261 fixed to the frame and which are yieldingly pressed against the disk by means of a spring 262 which surrounds a bolt 263 that is fixed at one end to a lug 264 of one of the brake members and extends through an opening in lug 265 of the other brake member; the spring being interposed between a nut 266 on said bolt and the lug 265.

A sprocket chain 270 travels about a sprocket wheel 271 on the driving shaft 40 (Figs. 2 and 4) and the sprocket wheels 234, 211ª and 148, which operate the raising screws 225, the paste applying fingers 210 and the stripper roller 145, respectively. Said sprocket chain is also trained over guide sprocket wheels 275 and 278, the former rotatively mounted on a fixed shaft carried by the machine frame and the latter carried by a tension device of common form, and designated as a whole by 279 (Fig. 4). The said chain is also trained about the guide and tension sprocket wheel 280 that is fixed on a shaft 281 which carries a gear wheel 282, which meshes with a gear wheel 283 fixed to a shaft 284, which operates the wrapper cutting and feeding mechanism. The said wrapper cutting and feeding mechanism is essentially like that shown in my prior U. S. Letters Patent No. 998,736, granted on 25th of July, 1911, and need not be further herein described.

In the operation of the machine the gums or other articles and their wrappers are advanced by the plunger 55, one at a time through the slot 49 from the lower end of the chute 45 and into the upper pocket 65 of the primary wrapper head 66. During the retractive movement of the plunger 55, the head 66 rotates in the direction of the arrow and carries the gum and wrapper delivered thereto to its lower side, as shown in Fig. 21. In the next rearward movement of the block 56 the plunger bar 100 is forced rearwardly to bring the shoulders 101 against the gum in the lower pocket of the head 66 to discharge the gum and wrapper from said pocket and advance the same beneath the bearer or presser member 39, as shown in Figs. 19, 22 and 23. During the advance movement of the plunger bar 100 another gum has been delivered to the upper pocket 65 by the plunger 55. The plunger bar is thereafter retracted to the position shown in Fig. 24, so that at its next advance movement it forces the partially wrapped package through the secondary wrapping slot 68 and thereby completes the wrapping of the package. Just before the partially wrapped gum is forced through the secondary folding slot the folding arms 67 swing downwardly as shown in Figs. 24 and 25 to fold down the end flaps of the package; and said end flaps are folded up against the lower end of the package by the curved surfaces 118 of the side folding horns 108, 108, as indicated in Figs. 26, 27 and 28. Just before the package is forced rearwardly out of the secondary folding slot, the stripper roller 145 and the gripper device have operated to place an outside wrapper b across the slot so that the package folds said outside wrapper about the advance margin thereof as it passes into and through the slot 200 and into the upper pocket 131 of the secondary wrapper head. While the package, with the outside wrapper partially folded thereon, occupies the upper pocket of the secondary wrapper head 130, the paste applying fingers 210 rotate into contact with the shorter margin of the outer wrapper and apply paste to said wrapper. Thereafter the secondary wrapper head is rotated in the direction of the arrow indicated on Fig. 3 to bring the package into line with the tertiary wrapping slot, and the plunger 143 thereafter advances to force the package through said wrapping slot. The plunger 143 forces the package between the elevating screws 125, 125 as indicated in Figs. 29 and 30 and said screws, rotating in opposite directions, lift the packages upward through the discharge chute, from whence they are discharged into any suitable place for the disposal thereof.

It will be observed that the three plungers 55, 100 and 143 are operated in unison to reciprocate in the same direction at the same time, the result being very conveniently effected by an attachment of said plungers to the block 56. This arrangement greatly simplifies the construction and facilitates its operation. The employment of the intermittently operated wrapper heads between the slots which are located on different planes and adapted to receive the gum or the like from one slot and to transfer them to another slot is a feature which contributes greatly to the simplicity and rapidity of operation of the machine; it being seen that the gums or other articles are thus continuously advanced without change of direction.

It will be obvious that many changes may be made in the structural details of the machine without departure from the scope and spirit of the invention, and the invention is therefore not limited to details of mechanism except as herein made the subject of specific claims. For instance, the folding or wrapping slots and wrapper heads may be arranged in other relation to each other, it only being necessary that said wrapper heads, of whatever construction, be arranged to transfer articles to be wrapped from one slot or channel in range with the head to another slot or channel also in range with the head. Furthermore, the constituent elements of the combination shown are capable of adaptation, as such, to other relations and combinations specifically different from the particular disclosures herein shown, while falling within the purview of the broader claims hereto appended.

I claim as my invention:—

1. A wrapping machine for wrapping flat, thin articles provided with a primary and a secondary wrapping slot or way arranged end to end, with means to present an article and a wrapper to the primary wrapping slot, means for forcing the article and wrapper through the primary slot to fold the wrapper about one side of the article, means for transferring the partially wrapped article to the secondary wrapping slot, means for forcing the partially wrapped article through the secondary wrapping slot to fold the wrapper about the other side of the article, and means arranged in advance of said transferring device for folding the end flaps of the wrapper around the ends of, and flat against one side of, the article.

2. A wrapping machine for wrapping flat, thin articles provided with a primary and a secondary wrapping slot or way arranged end to end in different planes with means to present an article and a wrapper to the primary wrapping slot, a transferring device for transferring the partially wrapped article from one end of the primary slot to the adjacent end of the secondary slot, with the end flaps extending in the plane of the article, two reciprocable plunger devices operating in unison, one to force the article and wrapper through the primary slot and into the transferring device to fold the wrapper about one side of the article and the other to force the partially wrapped article through the secondary slot to complete the folding of the wrapper about the other side of said article, and means arranged in advance, and at the sides, of said transferring device for folding the end flaps around the ends and flat against one side of the article.

3. A wrapping machine for wrapping flat, thin articles provided with a primary and secondary wrapping slot or way, arranged in different planes, with mechanism for delivering an article and a wrapper to and forcing them through the primary wrapping slot to fold the wrapper about one side of the article, an intermittently rotative wrapper head between said slots or ways with means to operate it, and arranged to receive an article and its wrapper partially folded thereon from the primary wrapping slot and, by its rotation, to carry them to the secondary wrapping slot or way, means for discharging said article and wrapper from the head to, and forcing the same through, the secondary wrapping slot or way to complete the folding of the wrapper about the article, and means for folding the end flaps around the ends of the article and against one side of the article.

4. A wrapping machine for wrapping flat, thin articles provided with a primary and secondary wrapping slot arranged in different planes, with means for presenting an article and a wrapper to the primary wrapping slot, an intermittently rotative wrapper head between the adjacent ends of said slots, with means to operate it, and provided with pockets which open on opposite sides of the head and are open at their ends, means for forcing an article and wrapper through the primary wrapping slot into the pocket at one side of the head to fold the wrapper about one side of the article, and with the ends flaps of the wrapper extending beyond the head, means for discharging the partially wrapped article from the pocket at another side of the head and into and through the secondary wrapping slot to complete the side folding of the wrapper about the said article, and end folding means in advance of the head to fold the extended end flaps flat against the side of the article.

5. A wrapping machine for wrapping flat, thin articles provided with a primary and secondary slot arranged in different planes, with means for presenting an article and a wrapper to the primary wrapping slot, and an intermittently rotative wrapper head between the adjacent ends of said slots with means to operate it, and provided at its sides with pockets, one in line with the primary wrapping slot and another in position to deliver the article and its wrapper to the secondary wrapping slot, and open at the ends of the head, a reciprocable plunger movable through the primary wrapping slot for forcing the article and wrapper through the latter slot and delivering them into one of said pockets to fold said wrapper about one side of the article, with the end flaps extending beyond the ends of the head, a secondary plunger device reciprocable in unison with the first mentioned plunger, to discharge the partially wrapped article from a pocket of said head and into and through the secondary wrapping slot to complete the side folding of the wrapper about the article and end folding means in advance of and at the sides of the head for folding the end flaps of the wrapper flat against the side of the article.

6. A wrapping machine provided with a primary and a secondary wrapping slot arranged in different parallel planes, an intermittently rotative wrapper head between the adjacent ends of said slots, with means to operate it, and arranged to receive an article and a wrapper from the primary wrapping slot and, by its rotation to deliver it to the secondary wrapping slot, and means for discharging the partially folded package from said head into and through the secondary wrapping slot, comprising a reciprocable plunger bar movable through the secondary wrapping slot, and a shoulder on said plunger bar to discharge the partially wrapped article from the head upon said plunger bar, whereby when the plunger bar is retracted past the partially wrapped article, said article falls into the path of said plunger bar to be thereby moved through the secondary wrapping slot in the succeeding advance movement of said plunger bar to complete the wrapping of the article.

7. In a wrapping machine provided with a wrapping slot, the combination with an intermittently movable member arranged to receive a partially wrapped article and to deliver it in a plane above the receiving end of said slot, of a reciprocable plunger bar movable through said slot, and a shoulder on the upper side of said bar adapted to discharge the partially wrapped article from said member upon the bar, during the advance movement of the latter, whereby, during the retractive movement of the bar, said article drops into the path of the bar to be thereby forced through the wrapping slot in the next advance movement of the bar to complete the wrapping of the article.

8. In a wrapping machine provided with a wrapping slot, the combination with an intermittently rotative head provided with pockets, with the pockets at the opposite sides of the head opening in opposite directions, means to deliver a partially wrapped article into a pocket at one side of the head, said article being carried in the pocket, by partial rotation of the head, to a plane above the receiving end of said slot, of a reciprocable plunger bar movable through a slot, said bar being longitudinally slotted to straddle said head, and laterally spaced shoulders on the upper side of said slotted bar adapted to discharge the partially wrapped article from the pocket upon said bar during the advance movement of the latter, whereby, during the retractive movement of the bar said article drops into the path of the bar to be thereby forced through the wrapping slot in the next advance movement of the bar to complete the wrapping of the article.

9. In a wrapping machine, an intermittently rotative head, with means to impart intermittent rotation thereto and provided at its sides with pockets which open outwardly on the opposite sides of the head, and are also open at the ends of the head, means for delivering an article and a wrapper partially folded about one side of the article into one of said pockets, with the end flaps of the wrapper extending outwardly from the ends of the head, said wrapper and article being carried by rotation of the head into position to be delivered to a wrapping slot, means for forcing the partially wrapped article from the pocket to and through the latter slot to complete the folding of the wrapper about the other side of the article, and end folding means in advance of the head to fold the end flaps of the wrapper around the ends of and flat against one side of the article.

10. In a wrapping machine, the combination of an intermittently rotative head provided with a pocket constructed to receive an article with a wrapper partially folded about it, said pocket being open at both ends to permit the end flaps of the wrapper to extend therefrom, operating mechanism for said head, end flap folding means located in advance of said head and operative to fold the ends of the wrapper over on to one side of the article, and means for carrying the article with its wrapper from said head through said end folding means.

11. In a wrapping machine, an intermittently rotative head, provided at its sides with pockets which open outwardly, with means for operating said head, the pocketed portions of said head being transversely slotted and spring devices carried by said head in the slots to hold the partially wrapped articles in the pockets.

12. In a wrapping machine, an intermittently rotative head, with means to impart intermittent rotative movement thereto, and provided at its opposite sides with pockets which open in opposite directions, means for delivering an article and a wrapper partially folded about one side of said article into one of the pockets, said wrapper and article being carried by rotation of the head in position to be delivered to a wrapping slot, means for forcing the article and wrapper from said pocket to and through the latter slot to complete the folding of the wrapper about the other side of the article and means operating during the time the article and the wrapper are being forced through said slot to fold the end flaps of the wrapper against one side of the package thus formed.

13. In a wrapping machine, an intermittently rotative head, with means to impart intermittent movement thereto, and provided at its opposite sides with pockets which open in opposite directions, means for delivering an article with a wrapper partially folded about one side of same into one of the pockets, said wrapper and article being carried by rotation of the head into position to be delivered to a wrapping slot, means for forcing the article and the wrapper from the head to and through the latter slot to complete the folding of the wrapper about the other side of the article, and folding arms carried by said head to start the folding of the end flaps of the wrapper against the side of the package.

14. In a wrapping machine, an intermittently rotative head with means to impart intermittent movement thereto, provided at its opposite sides with pockets which open in opposite directions, means for delivering an article with a wrapper partially folded about one side of the same into one of the pockets, said wrapper and article being carried by rotation of the head into position to be delivered to a wrapping slot, means for forcing the article and the wrapper from the head to and through the latter slot to complete the folding of the wrapper about the other side of the article, and folding arms carried by said head to fold the end flaps of the wrapper at right angles to the plane of the article, one side wall of the wrapping slot being slotted to receive the end flaps, and said slotted wall being curved to fold said end flaps against the package as it is advanced through the slot.

15. In a wrapping machine provided with a wrapping slot, the combination with means for presenting an article and a wrapper with its intermediate portion partially folded about the article to said slot, one wall of the slot being formed to provide a central and two side folding horns, with spaces between them, the central folding horn extending beyond the side folding horns at the receiving end of the slot, of means to force the partially wrapped article into and through the slot to fold the intermediate portion of the wrapper about the article, and folding arms movable past the extended end of the central folding horn to fold the end flaps of the wrapper in position to enter the spaces between the horns, said horns being transversely curved to fold the end flaps flat against the package as the latter is forced through the wrapping slot.

16. In a wrapping machine provided with a wrapping slot, the combination with means for presenting an article and a wrapper with its intermediate portion partially folded about the article to said slot, one wall of the slot being formed to provide a central and two side folding horns, with spaces between them, the central folding horn extending beyond the side folding horns at the receiving end of the slot, of means to force the partially wrapped article into and through the slot to fold the intermediate portion of the wrapper about the article, folding arms movable past the extended end of the central folding horn to fold the end flaps of the wrapper in position to enter the spaces between the horns, said horns being transversely curved to fold the end flaps flat against the package as the latter is forced through the wrapping slot, and creasing plates attached to the lateral faces of the central folding horn to coöperate with the folding arms to permanently crease the end flaps along the lines about which said flaps are folded.

17. In a wrapping machine provided with a wrapping slot, the combination with means for presenting an article and a wrapper with its intermediate portion partially folded about the article to said slot, one wall of the slot being formed to provide a central and two side folding horns, with spaces between them, the central folding horn extending beyond the side folding horns at the receiving end of the slot, of means to force the partially wrapped article into and through the slot to fold the intermediate portion of the wrapper about the article, folding arms movable past the extended end of the central folding horn to fold the end flaps of the wrapper in position to enter the spaces between the horns, said horns being transversely curved to fold the end flaps flat against the package as the latter is forced through the wrapping slot, and creasing plates attached to the lateral faces of the central folding horn to coöperate with the folding arms to permanently crease the end flaps along the lines about which said flaps are folded, the edges of the creasing plates being convexly curved, and the coöperating edges of the folding arms being concavely curved.

18. In a wrapping machine, the combination with means to fold a wrapper about the sides of an article with the end flaps extending beyond the ends of the article, a support along which the article is movable provided at its sides with edged creaser plates, folding arms movable past said creaser plates to turn the flaps about the edges thereof, and means for moving the article and wrapper along said support, the edges of said creaser plates being convexly curved and the coöperating edges of the folding arms being concavely curved, and said support being formed to act on the turned flaps as the package is moved along the same to fold said flaps flat against the package.

19. In a wrapping machine provided with a wrapping slot, the combination with an intermittently rotative head having means to operate same, and provided with pockets, means to deliver an article and wrapper partially folded about the side of the article into one of said pockets, the wrapper and article being carried by rotation of the head in position to be delivered to the wrapping slot, one of the walls of said wrapping slot being formed to provide a central and two side folding horns with spaces between them, of means to force the partially wrapped article from the head into and through said slot to fold the wrapper about the other side of said article, and folding arms carried by the head and coöperating with the lateral sides of the central folding horn to fold the end flaps of the wrapper in position to enter the spaces between the folding horns, said folding horns being transversely curved to fold the end flaps flat against the package as the latter is forced through the wrapping slot.

20. In a wrapping machine provided with a wrapping slot, the combination with an intermittently rotative head having means to operate the same and provided with pockets, and means to deliver an article and wrapper partially folded about one side thereof into one of the pockets, the wrapper and article being carried by the rotation of the head in position above the plane of the receiving end of the slot, the lower wall of the slot extending beyond the upper wall thereof at the receiving end of the slot, of a reciprocable plunger bar movable through said slot, said bar being provided on its upper side with a shoulder to discharge the partially wrapped article from the pocket upon said bar during the advance movement of the bar, whereby during the retractive movement of the bar, said article drops upon the said extended lower wall of the slot into the path of the bar to be thereby forced through the wrapping slot in the next advance movement of the bar to fold the wrapper against the other side of the article and means at the receiving end of the slot to engage the package after it has been discharged upon the plunger bar to prevent retraction of the package during the retractive movement of the plunger bar.

21. In a wrapping machine provided with a wrapping slot, the combination with an intermittently rotative head having means to operate the same and provided with pockets, and means to deliver an article and wrapper partially folded about one side thereof into one of the pockets, the wrapper and article being carried by rotation of the head in position above the plane of the receiving end of the wrapping slot, the lower wall of the slot being formed to provide a central and two side folding horns, with spaces between them, the central folding horn extending beyond the side folding horns at the receiving end of the slot, and the inner sides of said horns being transversely curved, of a reciprocable plunger bar movable through said slot said bar being provided on its upper side with a shoulder to discharge the partially wrapped article from the pocket upon said bar during the advance movement of the bar, whereby, during the retractive movement of the bar said article drops upon the central folding horn into the path of the bar to be thereby forced through the wrapping slot in the next advance movement of the bar to fold the wrapper against the other side of the article, means at the receiving end of the slot to fold the end flaps of the wrapper in position to enter the spaces between the horns as the package is forced through the said slot, and means at the receiving end of the slot to engage the package after it has been discharged upon the plunger bar to prevent retraction of the package during the retractive movement of the plunger bar.

22. In a wrapping machine provided with a wrapping slot, the combination with an intermittently rotative head having means to operate the same and provided with pockets, and means to deliver an article and wrapper partially folded about one side thereof into one of the pockets, the wrapper and article being carried by rotation of the head in position above the plane of the receiving end of the wrapping slot, the lower wall of the slot being formed to provide a central and two side folding horns, with spaces between them, the central folding horns extending beyond the side folding horns at the receiving end of the slot, and the inner side of the side horns being transversely curved, of a reciprocable plunger bar movable through said slot, and said bar being provided on its upper side with a shoulder to discharge the partially wrapped article from the pocket upon said bar during the advance movement of the bar, whereby, during the retractive movement of the bar said article drops upon the central folding horn into the path of the bar to be thereby forced through the wrapping slot in the next advance movement of the bar to fold the wrapper against the other side of the article, means at the receiving end of the slot to fold the end flaps of the wrapper in position to enter the spaces between the horns as the package is forced through said slot, means at the receiving end of the slot to engage the package after it has been discharged upon the plunger bar to prevent retraction of the package during the retractive movement of the plunger bar, and a presser device located at and constituting the upper wall of the slot at its receiving end.

23. In a wrapping machine, a wrapper head comprising a body provided with pockets which open in opposite directions, and provided exterior to said pockets with two pairs of fixed folding arms, with the arms of each pair located at opposite ends of said body.

24. In a wrapping machine, a wrapper head comprising a body provided with pockets which open in opposite directions and provided exterior to said pockets with two pairs of fixed folding arms with the arms of each pair located at the opposite ends of said body, the advance margins of the arms of each pair being concavely curved.

25. A wrapping machine provided with a primary, secondary and a tertiary wrapping slot arranged end to end, with means to present an article and a wrapper to the primary slot, means for forcing the article and wrapper through the primary slot to fold the wrapper about one side of the article, a transferring device for transferring the partially wrapped article to the secondary slot, means for forcing the partially wrapped article through the secondary slot to fold the wrapper about the other side of the article, means for folding the end flaps of the wrapper against the side of the package, a transferring device for transferring the package from the secondary to the tertiary slot, means between the latter transferring device and the secondary slot for presenting an outer wrapper into the path of the package, and means for forcing the partially wrapped package through the tertiary slot to complete the folding of the outer wrapper about the same.

26. A wrapping machine provided with a primary, a secondary and a tertiary wrapping slot arranged end to end, with means to present an article and a wrapper to the primary slot, means for forcing the article and wrapper through the primary slot to fold the wrapper about one side of the article, a transferring device for transferring the partially wrapped article to the secondary slot, means for forcing the partially wrapped article through the secondary slot to fold the wrapper about the other side of the article, means for folding the end flaps against the side of the package, a transferring device for transferring the package from the secondary slot to the tertiary slot, means between the latter transferring device and the secondary slot for presenting an outer wrapper into the path of the package to fold the wrapper about one side of the package, means for applying paste to one margin of the wrapper thus folded upon the package, and means for forcing the partially wrapped package through the tertiary slot to fold the other margin of the outer wrapper upon the pasted margin thereof.

27. A wrapping machine provided with a primary, a secondary and a tertiary wrapping slot arranged end to end, with means to present an article and a wrapper to the primary slot, a primary transferring device between the primary slot and the adjacent end of the secondary slot, a secondary transferring device between the secondary slot and the adjacent end of the tertiary slot, reciprocable plunger devices, one to force the article and wrapper through the primary slot to the primary transferring device to fold the wrapper about one side of the article, and the other to force the partially wrapped article through the secondary folding slot to fold the wrapper about the other side of the article and to deliver the article to the secondary transferring device, means between the secondary slot and the secondary transferring device to present an outer wrapper across the path of the package, and a reciprocable tertiary plunger to force the article and wrapper through the tertiary slot to complete the folding of the outer wrapper about the package.

28. A wrapping machine provided with a primary, a secondary and a tertiary wrapping slot, arranged end to end, with means to present an article and a wrapper to the primary slot, intermittently rotative primary and secondary wrapper heads having means to operate them in unison, the former located between the primary slot and the secondary slot and the latter located between the secondary slot and the tertiary slot, and said heads each having pockets to receive an article and a wrapper partially folded thereon from one slot, and by its rotation to deliver the article and wrapper to the next adjacent slot, parallel, reciprocable primary, secondary and tertiary plungers movable through their respective slots, with means to operate them in unison, the secondary and tertiary plungers being constructed to force the articles and wrappers from said respective heads into and through said secondary and tertiary slots respectively, and the secondary plunger being adapted to discharge the article wrapped with the inner wrapper from the secondary slot to the secondary wrapper head, mechanism located between the secondary slot and the secondary wrapper head to present an outer wrapper across the path of the package transferred from the secondary slot to the secondary wrapper head, and means for applying paste to the outer wrapper.

29. A wrapping machine provided with a primary, secondary and a tertiary wrapping slot arranged end to end, with means to present an article and wrapper to the primary slot, intermittently rotative primary and secondary wrapper heads, the former located between the primary and secondary slots and the latter located between the secondary slot and the tertiary slots, shafts for said heads provided with intermeshing gears, a driving shaft mounted in the machine frame and connected to one of the wrapper head shafts by a gearing constructed to impart intermittent rotative movement to said wrapper head shafts, said heads each having means to receive an article and a wrapper partially folded thereon from one slot, and by its rotation to deliver the article and wrapper to the next adjacent slot, primary, secondary and tertiary plungers movable through their respective slots, with means to operate them in unison, the secondary and tertiary plungers being constructed to force the articles and wrappers from said heads into and through said secondary and tertiary slots respectively, and the secondary plunger being adapted to discharge the article wrapped with the inner wrapper from the secondary slot to the secondary wrapper head, mechanism located between the secondary slot and the secondary wrapper head to present an outer wrapper across the path of the article transferred from the secondary slot to the secondary wrapper head, and means for applying paste to the outer wrapper.

30. In a wrapping machine for wrapping an inner and an outer wrapper about an article, provided with primary, secondary and tertiary wrapping slots, arranged end to end, the combination with wrapper heads, each located between two adjacent slots and having means to receive an article and wrapper from the discharge end of one slot and by its rotation to carry it to the receiving end of the next adjacent slot, shafts on which said heads are mounted and provided with intermeshing gears, a driving shaft mounted on the machine frame, gearing connecting the driving shaft to one of the wrapper head shafts, embracing means to impart an intermittent rotative movement in unison to said wrapper head shafts, means for presenting the wrapper in the path of the article, and plunger devices operatively connected to and driven by said driving shaft for successively transferring the articles and wrappers from the slots to the heads and from the heads to the slots, as set forth.

31. A wrapping machine for wrapping an inner and an outer wrapper about an article, comprising means for folding the sides and ends of the inner wrapper about the article, said latter means embracing a fixed folding slot and a plunger for forcing the article and wrapper therethrough to complete the folding of the inner wrapper about the article, an intermittently rotative wrapper head at the discharge end of the slot having means to receive the package discharged from said slot, with means to rotate said head to carry said package to a fixed slot, mechanism between the first slot and the wrapper head for presenting an outer wrapper across the path of the package and a plunger reciprocable through the second slot and movable in unison with the first mentioned plunger for forcing the partially wrapped package from said head into and through the second slot to complete the folding of the outer wrapper about the package.

32. A wrapping machine provided with a primary, a secondary and a tertiary wrapping slot arranged end to end, with means to present an article and a wrapper to the primary slot, a primary transferring device between the primary slot and the adjacent end of the secondary slot, a secondary transferring device between the secondary slot and the adjacent end of the tertiary slot, reciprocable plunger devices, one to force the article and the wrapper through the primary slot to the primary transferring device to fold the wrapper about one side of the article, and the other to force the partially wrapped article through the secondary folding slot to fold about the other side of the article and to deliver the article to the secondary transferring device, means between the secondary slot and the secondary transferring device to present an outer wrapper across the path of the package to fold the wrapper about one side of the package, a reciprocable tertiary plunger to force the partially wrapped package through the tertiary slot to complete the folding of the outer wrapper about the package, right and left hand screws at the discharge end of the tertiary slot between which the wrapped articles are delivered with means for rotating them in opposite directions, and a chute through which the wrapped articles are forced by the screws.

33. In a wrapping machine, the combination with an intermittently rotative wrapping head and operating means therefor, said head being provided with pockets which open in opposite directions and are each constructed to receive a package with a wrapper partially folded about it, of end flap folding devices positioned in advance of said head and operative to complete the end folding operations on the package after it has been ejected from one of said pockets, and package advancing means operative through contact with each package to force them one at a time out of the pockets of said head and to present them to the operation of said end flap folding devices and cause said devices to complete the wrapping operations.

34. In a wrapping machine, an intermittently rotative head with means to actuate it, and provided at its sides with pockets which open in opposite directions and also at the ends of the head, and are arranged in different planes, and plunger devices cooperating with said pockets, combined with end folding means at the ends and in advance of said head to hold the end flaps against the side of the article through which the article and wrapper are forced by the plunger devices.

35. A machine of the character described comprising channel sections, and a series of wrapper folding devices arranged in line therewith, a series of plunger arms, and the machine having means for actuating said plunger arms whereby one of said plunger arms forces an article and a wrapper through one of said channel sections, thereby causing the wrapper to be folded upon said article, said plunger arm also moving said article and partially folded wrapper into one of said wrapper folding devices, said means for actuating said plunger arms causing a second plunger arm to force said article and wrapper into a second channel section whereby the wrapper is further folded, said second plunger arm also moving said article and wrapper into a second wrapper folding device.

36. A machine of the character described comprising channel sections, and a series of wrapper folding devices arranged in line therewith, a series of plunger arms, means whereby one of said plunger arms forces an article and a wrapper through one of said channel sections whereby the wrapper is folded upon the article, said plunger arm also moving said article and wrapper into one of said wrapper folding devices, means whereby a second plunger arm forces said article and wrapper into a second channel section, whereby the wrapper is further folded, said second plunger arm also moving said article and wrapper into a second wrapper folding device, and means whereby a third plunger arm forces said article and wrapper into a third channel section whereby the wrapper is folded, substantially as described.

37. In a wrapping machine for wrapping articles with end flaps folded flat against the sides of the article, means for folding the wrapper about the sides of the article with the end flaps extending beyond the ends of the article, end flap folding arms movable past the ends of the article, in planes at right angles to the plane of the article, and creaser plates over which the double end flaps are folded and convexly curved to engage the bases of the end flaps, the folding arms being concavely curved complemental to the creaser plates, for the purpose set forth.

38. In a wrapping machine provided with a wrapping slot or channel, and intermittently rotative, slotted head, with means to intermittently rotate the same, means for delivering an article and wrapper partially folded about the same to said head, said wrapper and article being carried by rotation of said head into position to be delivered to said slot, means for forcing the article and wrapper from said head to and through said slot to complete the folding of the wrapper about the article, and means operating during the passage of the article and wrapper through said slot to fold the end flaps of the wrapper over upon one side of the article.

39. In a wrapping machine provided with a wrapping slot or channel, an intermittently rotative, slotted head, with means to intermittently rotate the same, means for delivering an article and a wrapper partially folded about the same to the said head, said wrapper and article being carried by rotation of said head into position to be delivered to said slot, means for forcing the article and wrapper from said head to and through said slot to complete the folding of the wrapper about the article, means operating during the passage of the article and wrapper through said slot to fold the end flaps of the wrapper upon the article combined with means for applying a label wrapper to the package thus wrapped.

40. In a wrapping machine, the combination of a reciprocating plunger having two plunger faces offset with relation to each other and spaced apart in the direction of travel of the plunger so that one face is in advance of the other, mechanism for reciprocating said plunger, means for delivering articles to said plunger one at a time in front of the rear plunger face whereby said rear face is operative upon the forward stroke of the plunger to move an article so delivered to a point in advance of the limit of the rearward stroke of the front face of said plunger, and means acting on said article through engagement with its faces other than its face adjacent to said plunger to prevent its moving rearwardly during the return stroke of the plunger but operative to cause the article to be moved in front of the forward plunger face when the plunger nears the backward limit of its stroke whereby said article will be advanced by said front face upon the next forward movement of the plunger.

41. In a wrapping machine, means to fold a wrapper about the four sides of a flat, thin article with the ends of the wrapper extending beyond the article to constitute end flaps, convex creaser plates about which the bases of said end flaps are folded, and folding arms movable past said plates and formed with concave surfaces to coöperate with the convex edges of the creaser plates.

42. In a wrapping machine, the combination of a reciprocating plunger having two plunger faces offset with relation to each other and spaced apart in the direction of travel of the plunger so that one face is in advance of the other, mechanism for reciprocating said plunger, means for delivering articles to said plunger one at a time in front of the rear plunger face whereby said rear face is operative upon the forward stroke of the plunger to move an article so delivered to a point in advance of the limit of the rearward stroke of the front face of said plunger, and a yielding presser device under which the article is moved by said rear face, said presser device acting on said article to hold it against the surface of said plunger during the return stroke of the plunger but being operative to cause the article to move in front of the forward plunger face when the plunger nears the backward limit of its stroke whereby said article will be advanced by said front face upon the next forward movement of the plunger.

43. In a wrapping machine, the combination of a reciprocating plunger having two plunger faces offset with relation to each other and spaced apart in the direction of travel of the plunger so that one face is in advance of the other, mechanism for reciprocating said plunger, means for delivering articles to said plunger one at a time in front of the rear plunger face whereby said rear face is operative upon the forward stroke of the plunger to move an article so delivered to a point in advance of the limit of the rearward stroke of the front face of said plunger, and a latch constructed and arranged to prevent the backward movement of said article during the return stroke of said plunger, said plunger faces being so spaced with reference to the stroke of the plunger that the front plunger face will, upon the backward stroke of the plunger, move behind the article previously advanced by the rear face and will advance said article farther upon the next forward stroke of the plunger.

44. In a wrapping machine, the combination with a rotative wrapping head having a pocket constructed to receive an article with a wrapper partially folded about it, of a paste applying device rotatable about a fixed axis in a path tangent to a part of a package in said pocket, said head being constructed to permit said application and being cut away in front of the points at which the paste is applied to avoid the smearing of the paste on the walls of the pocket when the package is pushed out of it.

45. In a wrapping machine, the combination with mechanism constructed and arranged to wrap flat, thin articles, an upwardly directed and rearwardly curved discharge chute for the wrapped articles at the rear end of the machine provided at its lower end with an opening to receive said articles, a pair of lifting screws positioned at opposite ends of the bottom of said chute, means for rotating said screws, and means for advancing the wrapped articles one at a time from the wrapping mechanism through said opening to said screws, whereby said screws will act on opposite ends of each wrapped article to force it upwardly into said chute.

46. In a wrapping machine, the combination with an intermittently rotative wrapping head having a pocket constructed to receive an article with a wrapper partially folded about it and operating mechanism for said head, of means for ejecting a package from said pocket with the end flaps of the wrapper projecting beyond the opposite ends of the article, means constructed and arranged to turn said wrapper flaps at substantially right angles to the length of the article after it has been ejected from said head, and stationary folding means operative thereafter to turn said flaps against one side of the package.

47. A machine of the character described, comprising an intermittently rotative wrapper member, a channel on either side in range therewith, and a plunger adapted to move a previously wrapped article and a wrapper through one of the channels, whereby the wrapper is folded upon said wrapped article, said plunger also causing said wrapped article and partially folded wrapper to be moved into said wrapper member, means for causing a half rotation of said wrapper member, whereby the wrapper is further folded upon the article, means for applying paste to one margin of said wrapper, and a second plunger adapted to move said article and partially folded wrapper out of said wrapper member and into another channel, whereby the paste coated part of the wrapper is folded upon one of said folds of the wrapper.

48. A machine of the character described comprising channel sections, having upper and lower plates, a series of plungers, and the machine having means for actuating said plungers, whereby one of said plungers forces an article and a wrapper through one of the said channel sections thereby causing said wrapper to be partially folded, a wrapper folding mechanism causing said wrapper to be folded at right angles to said upper plates, said means for actuating said plungers causing a second plunger to force said article and partially folded wrapper through a second channel section, whereby said wrapper is further folded, the upper and lower plates of said second channel section being of less width than the wrapper, which latter overhangs the article, folder arms above the overhanging end flaps of said partially folded wrapper and adapted to fold said end flaps downwardly, combined with folding notches in the lower plate to fold the end flaps against the package, and means for moving said article and wrapper forwardly along said channel, whereby said notches fold the end flaps against the side of the resultant package.

49. A machine of the character described, comprising channel sections, and a series of wrapper folding devices arranged in line therewith, a series of plungers, means whereby one of said plungers forces an article and a wrapper through one of the said channel sections whereby the wrapper is folded upon the article, said plunger also moving said article and wrapper into one of said wrapper folding devices, means whereby a second plunger forces said article and wrapper into a second channel section whereby the wrapper is further folded, said second plunger also moving said article and wrapper into a second wrapper folding device, means whereby a third plunger forces said article and wrapper into a third channel section, and means whereby said article and folded wrapper and a second or outer wrapper are forced by said second plunger into said second wrapper folding device.

50. A machine of the character described comprising a series of wrapper folding devices arranged in line one with another, a series of plungers, means whereby one of said plungers forces an article and wrapper into one of said wrapper folding devices, means whereby a second plunger forces said article and wrapper into a second wrapper folding device, and means whereby a third plunger forces said article and folded wrapper and a second wrapper into a third wrapper folding device.

51. In a wrapping machine, the combination with an intermittently rotative wrapping head having a pocket constructed to receive an article with a wrapper partially folded about it and operating mechanism for said head, of means for ejecting a package from said pocket with the end flaps of the wrapper projecting beyond the opposite ends of the article, a support along which the package is moved by said ejecting means, creasing means constructed and arranged to crease said end flaps after the article has been ejected from said head, and stationary folding means operative thereafter to complete the folding of said end flaps.

52. In a wrapping machine, the combination with an intermittently rotative wrapping head having a pocket constructed to receive an article with a wrapper partially folded about it and operating mechanism for said head, of means for ejecting a package from said pocket with the end flaps of the wrapper projecting beyond the opposite ends of the article, a support along which the package is moved by said ejecting means, creasing means constructed and arranged to crease said end flaps after the article has been ejected from said head, and folding means operative thereafter to complete the folding of said flaps.

53. In a wrapping machine, the combination with an intermittently rotative wrapping head having a pocket constructed to receive an article with a wrapper partially folded about it and operating mechanism for said head, of means for ejecting a package from said pocket with end flaps of the wrapper projecting beyond the opposite ends of the article, and means carried by said head for performing a folding operation on said end flaps after the article has been ejected from the head.

54. In a wrapping machine, the combination of plunger mechanism including a plunger having two pushing faces one in advance of and below the other, means for delivering articles one at a time on to said plunger, guiding means coöperating with said plunger whereby the rear face of the plunger is operative on its forward stroke to move an article so delivered to a position in advance of the limit of the rearward stroke of the front face of said plunger, said guiding means being operative to retain the article in contact with the plunger whereby, upon its return movement, the article will be positioned in front of said front face, means for preventing the rearward movement of the article, and means for reciprocating said plunger.

55. In a wrapping machine, the combination of an intermittently rotative head provided with a pocket constructed to receive an article with a wrapper partially folded about it, said pocket being open at both ends to permit the end flaps of the wrapper to extend therefrom, operating mechanism for said head, a folding chute located in advance of said head and provided with stationary folders operative to fold the ends of the wrapper over on to one side of the article, and a plunger arranged to force the article with its wrapper from said head through said folding chute.

In testimony, that I claim the foregoing as my invention I affix my signature in the presence of two witnesses, this 20th day of October, A. D. 1911.

HARRY YARRINGTON ARMSTRONG.

Witnesses:
W. L. HALL,
G. E. DOWLE.

of said head and provided with stationary folders operative to fold the ends of the wrapper over on to one side of the article, and a plunger arranged to force the article with its wrapper from said head through said folding chute.

In testimony, that I claim the foregoing as my invention I affix my signature in the presence of two witnesses, this 20th day of October, A. D. 1911.

HARRY YARRINGTON ARMSTRONG.

Witnesses:
W. L. HALL,
G. E. DOWLE.

---

Correction in Letters Patent No. 1,187,696.

It is hereby certified that in Letters Patent No. 1,187,696, granted June 20, 1916, upon the application of Harry Yarrington Armstrong, of Elgin, Illinois, for an improvement in "Gum-Wrapping Machines," an error appears in the printed specification requiring correction as follows: Page 16, line 20, claim 34, for the word "hold" read *fold;* and that the said Letters Patent should be read with this correction therein that the same may conform to the record of the case in the Patent Office.

Signed and sealed this 12th day of September, A. D., 1916.

[SEAL.]

F. W. H. CLAY,
*Acting Commissioner of Patents.*

It is hereby certified that in Letters Patent No. 1,187,696, granted June 20, 1916, upon the application of Harry Yarrington Armstrong, of Elgin, Illinois, for an improvement in "Gum-Wrapping Machines," an error appears in the printed specification requiring correction as follows: Page 16, line 20, claim 34, for the word "hold" read *fold;* and that the said Letters Patent should be read with this correction therein that the same may conform to the record of the case in the Patent Office.

Signed and sealed this 12th day of September, A. D., 1916.

[SEAL.]

F. W. H. CLAY,
*Acting Commissioner of Patents.*